United States Patent
Stanek et al.

(10) Patent No.: US 8,891,249 B2
(45) Date of Patent: Nov. 18, 2014

(54) DISPLAY MOUNT WITH ADJUSTABLE POSITION TILT AXIS

(75) Inventors: Nick Stanek, Roseville, MN (US); Peter Tribuno, Roseville, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 13/143,073

(22) PCT Filed: Jan. 7, 2010

(86) PCT No.: PCT/US2010/020389
§ 371 (c)(1),
(2), (4) Date: Sep. 22, 2011

(87) PCT Pub. No.: WO2010/080925
PCT Pub. Date: Jul. 15, 2010

(65) Prior Publication Data
US 2012/0002393 A1  Jan. 5, 2012

Related U.S. Application Data

(60) Provisional application No. 61/143,135, filed on Jan. 7, 2009.

(51) Int. Cl.
H05K 7/02 (2006.01)
H05K 7/04 (2006.01)
(Continued)

(52) U.S. Cl.
CPC ............... *F16M 11/10* (2013.01); *F16M 11/24* (2013.01); *H04N 5/655* (2013.01); *F16M 13/02* (2013.01); *Y10S 248/917* (2013.01); *Y10S 248/923* (2013.01)
USPC ................. 361/810; 361/679.06; 361/679.21; 248/276.1; 248/917; 248/923

(58) Field of Classification Search
CPC ... F16M 11/04; F16M 11/043; F16M 11/046; F16M 11/06; F16M 11/10; F16M 11/12; F16M 11/125; F16M 11/24
USPC ........ 361/810, 679.06, 679.21; 248/917, 919, 248/176.1, 276.1, 920, 921, 922, 923
See application file for complete search history.

(56) References Cited

U.S. PATENT DOCUMENTS

| | | |
|---|---|---|
| 153,943 A | 8/1874 | Gray |
| 212,618 A | 2/1879 | Miller |

(Continued)

FOREIGN PATENT DOCUMENTS

| | | |
|---|---|---|
| CN | 101132887 | 2/2008 |
| DE | 3215379 A1 | 10/1983 |

(Continued)

OTHER PUBLICATIONS

File History for U.S. Appl. No. 12/512,593, filed Aug. 28, 2009, Published Nov. 25, 2010, as U.S. Publication No. 2010/0294904.

(Continued)

*Primary Examiner* — Jeremy C Norris
*Assistant Examiner* — Roshn Varghese
(74) *Attorney, Agent, or Firm* — Patterson Thuente Pedersen, P.A.

(57) ABSTRACT

A display mount includes a wall interface that can be attached on a wall and a display interface that can be attached to a flat panel display. The width of the wall interface can be adjusted to accommodate flat panel display of different sizes. The display interface can be positioned on the mounting interface and adjusted to achieve a desired viewing angle of flat panel display. The display mount enables the flat panel display to be self balancing at any point along the tilting travel of the display and avoids contact between the wall and the display when the display is tilted.

19 Claims, 41 Drawing Sheets

(51) Int. Cl.
  *G06F 1/16*   (2006.01)
  *H05K 5/00*   (2006.01)
  *H05K 7/00*   (2006.01)
  *E04G 3/00*   (2006.01)
  *F16M 11/24*  (2006.01)
  *F16M 11/10*  (2006.01)
  *F16M 13/02*  (2006.01)
  *H04N 5/655*  (2006.01)

(56) References Cited

U.S. PATENT DOCUMENTS

| | | |
|---|---|---|
| 257,050 A | 4/1882 | Munson |
| 1,282,489 A | 10/1918 | Strodel |
| 1,320,775 A | 11/1919 | Mather |
| 1,358,159 A | 11/1920 | Kern |
| 1,574,227 A | 2/1926 | Andersen |
| 1,628,218 A | 5/1927 | Beauchamp |
| 1,646,379 A | 10/1927 | Whitehead |
| 1,977,153 A | 10/1934 | Spence, Jr. |
| 2,030,889 A | 2/1936 | Negrotto |
| 2,233,882 A | 3/1941 | Bobek |
| 2,466,219 A | 4/1949 | Farrell et al. |
| 2,734,708 A | 2/1956 | Cohn |
| 2,967,035 A | 10/1961 | Simons |
| 3,146,738 A | 9/1964 | Telarico |
| 3,182,946 A | 5/1965 | Dudko |
| 3,188,030 A | 6/1965 | Fischer |
| 3,464,661 A | 9/1969 | Alesi, Jr. |
| 3,574,340 A | 4/1971 | Busche |
| 3,698,329 A | 10/1972 | Diamond et al. |
| D232,917 S | 9/1974 | Vincent |
| 3,856,246 A | 12/1974 | Sinko |
| 4,068,961 A | 1/1978 | Ebner et al. |
| 4,202,520 A | 5/1980 | Loos et al. |
| 4,238,802 A | 12/1980 | Speicher |
| D260,336 S | 8/1981 | Springer |
| D266,827 S | 11/1982 | Withrow |
| 4,483,503 A | 11/1984 | Gahan |
| 4,483,803 A | 11/1984 | Rizkalla |
| D279,249 S | 6/1985 | Fausel |
| 4,549,710 A | 10/1985 | Prince et al. |
| 4,554,590 A | 11/1985 | Chelin et al. |
| D282,328 S | 1/1986 | Brescia et al. |
| 4,562,988 A | 1/1986 | Bumgardner |
| 4,616,218 A * | 10/1986 | Bailey et al. ............ 361/679.21 |
| 4,621,782 A | 11/1986 | Carlson et al. |
| 4,645,153 A | 2/1987 | Granzow et al. |
| 4,652,890 A | 3/1987 | Crean |
| 4,687,305 A | 8/1987 | Harris, Jr. et al. |
| 4,708,312 A | 11/1987 | Rohr |
| D293,404 S | 12/1987 | Murphy |
| 4,718,317 A | 1/1988 | Hensler |
| 4,718,519 A | 1/1988 | Barker |
| 4,762,378 A | 8/1988 | Kagami |
| 4,768,744 A | 9/1988 | Leeds et al. |
| 4,814,759 A | 3/1989 | Gombrich et al. |
| 4,836,478 A | 6/1989 | Sweere |
| 4,836,486 A | 6/1989 | Vossoughi et al. |
| 4,844,387 A | 7/1989 | Sorgi et al. |
| 4,880,191 A | 11/1989 | Lake, Jr. |
| 4,934,645 A | 6/1990 | Breslow |
| 4,938,005 A | 7/1990 | Focke |
| 4,953,256 A * | 9/1990 | Salmela et al. ............ 248/572 |
| D311,130 S | 10/1990 | Whitaker |
| 4,989,813 A | 2/1991 | Kim et al. |
| 5,007,608 A | 4/1991 | Carroll, Jr. |
| 5,037,050 A | 8/1991 | Lin et al. |
| 5,040,759 A | 8/1991 | Wainwright |
| 5,069,411 A | 12/1991 | Murphy |
| 5,102,081 A | 4/1992 | Barchus |
| 5,102,082 A | 4/1992 | Bang |
| 5,139,223 A | 8/1992 | Sedighzadeh |
| 5,165,644 A | 11/1992 | Allen |
| D331,338 S | 12/1992 | Sussman |
| 5,195,900 A | 3/1993 | Kumagai et al. |
| 5,209,446 A | 5/1993 | Kawai |
| 5,277,392 A | 1/1994 | Rossman et al. |
| 5,305,114 A | 4/1994 | Egashira et al. |
| 5,322,255 A | 6/1994 | Garrett |
| 5,348,385 A | 9/1994 | Berg |
| 5,398,901 A | 3/1995 | Brodmann et al. |
| 5,404,182 A | 4/1995 | Nomura |
| D359,643 S | 6/1995 | Langmade |
| D361,062 S | 8/1995 | Lino et al. |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,584,735 A | 12/1996 | McMath |
| 5,603,478 A | 2/1997 | Wang |
| 5,632,463 A | 5/1997 | Sung et al. |
| 5,634,622 A | 6/1997 | Pye |
| 5,664,752 A | 9/1997 | Matthiessen et al. |
| 5,687,939 A | 11/1997 | Moscovitch |
| 5,687,944 A | 11/1997 | Shon |
| 5,713,549 A | 2/1998 | Shieh |
| 5,732,922 A | 3/1998 | Jeon |
| 5,743,503 A | 4/1998 | Voeller et al. |
| 5,751,548 A | 5/1998 | Hall et al. |
| 5,768,648 A | 6/1998 | Skipp et al. |
| D395,892 S | 7/1998 | Solomon |
| 5,793,503 A | 8/1998 | Haines et al. |
| 5,797,568 A | 8/1998 | Canton Gongora et al. |
| D400,085 S | 10/1998 | Haskin |
| 5,827,441 A | 10/1998 | Solbjorg |
| 5,842,672 A | 12/1998 | Sweere et al. |
| 5,854,735 A | 12/1998 | Cheng |
| D406,476 S | 3/1999 | Boije |
| 5,876,008 A | 3/1999 | Sweere et al. |
| 5,918,841 A | 7/1999 | Sweere et al. |
| 5,918,845 A | 7/1999 | Whitaker |
| 5,923,528 A | 7/1999 | Lee |
| 5,923,853 A | 7/1999 | Lee |
| 5,924,665 A | 7/1999 | Sweere et al. |
| 5,941,493 A | 8/1999 | Cheng |
| 5,947,429 A | 9/1999 | Sweere et al. |
| D415,768 S | 10/1999 | Howell |
| 5,992,802 A | 11/1999 | Campbell |
| 5,992,809 A | 11/1999 | Sweere et al. |
| D417,611 S | 12/1999 | Van de Lande |
| 5,996,961 A | 12/1999 | Johnson |
| 6,000,560 A | 12/1999 | Barkan |
| 6,012,693 A | 1/2000 | Voeller et al. |
| 6,015,120 A | 1/2000 | Sweere et al. |
| 6,019,332 A | 2/2000 | Sweere et al. |
| 6,036,337 A | 3/2000 | Belfer |
| 6,042,068 A | 3/2000 | Tcherny |
| 6,045,103 A | 4/2000 | Costa et al. |
| 6,047,939 A | 4/2000 | Kim |
| 6,048,013 A | 4/2000 | Moilanen et al. |
| 6,061,104 A | 5/2000 | Evanicky et al. |
| 6,068,227 A | 5/2000 | Morgan et al. |
| D426,142 S | 6/2000 | Moore |
| 6,086,034 A | 7/2000 | McAllister et al. |
| 6,102,348 A | 8/2000 | O'Neill |
| 6,113,047 A | 9/2000 | Wung et al. |
| 6,119,997 A | 9/2000 | Van Lieshout |
| 6,125,030 A | 9/2000 | Mola et al. |
| 6,126,128 A | 10/2000 | Costa et al. |
| 6,138,970 A | 10/2000 | Sohrt et al. |
| RE36,978 E | 12/2000 | Moscovitch |
| 6,189,842 B1 | 2/2001 | Bergeron Gull et al. |
| 6,189,849 B1 * | 2/2001 | Sweere et al. ............ 248/286.1 |
| 6,189,850 B1 | 2/2001 | Liao et al. |
| D440,863 S | 4/2001 | Worrall |
| 6,213,438 B1 | 4/2001 | Ostby et al. |
| 6,213,821 B1 | 4/2001 | Bernloehr et al. |
| 6,244,552 B1 | 6/2001 | Adams et al. |
| 6,264,152 B1 | 7/2001 | Bloch et al. |
| 6,273,382 B1 | 8/2001 | Pemberton |
| 6,273,383 B1 | 8/2001 | Oddsen, Jr. |
| 6,292,981 B1 | 9/2001 | Ford et al. |

(56) References Cited

U.S. PATENT DOCUMENTS

| | | | |
|---|---|---|---|
| 6,336,037 B1 | 1/2002 | Sekine et al. | |
| 6,340,146 B1 | 1/2002 | Tzeng | |
| 6,347,776 B1 | 2/2002 | Chuang | |
| 6,354,549 B2 | 3/2002 | Sweere et al. | |
| 6,361,012 B1 | 3/2002 | Chang | |
| 6,367,756 B1 | 4/2002 | Wang | |
| 6,378,171 B1 | 4/2002 | Suzuki et al. | |
| 6,378,830 B1 | 4/2002 | Lu | |
| 6,394,403 B1 | 5/2002 | Hung | |
| 6,402,109 B1 * | 6/2002 | Dittmer | 248/284.1 |
| 6,409,127 B1 | 6/2002 | VanderHeide et al. | |
| 6,409,134 B1 | 6/2002 | Oddsen, Jr. | |
| D460,078 S | 7/2002 | Li | |
| 6,416,027 B1 | 7/2002 | Hart | |
| 6,418,010 B1 | 7/2002 | Sawyer | |
| 6,419,196 B1 | 7/2002 | Sweere et al. | |
| 6,450,467 B2 | 9/2002 | Timm | |
| 6,453,509 B1 | 9/2002 | Shin | |
| 6,454,234 B1 | 9/2002 | Westbrook | |
| 6,478,274 B1 | 11/2002 | Oddsen, Jr. | |
| 6,478,275 B1 | 11/2002 | Huang | |
| 6,484,987 B2 | 11/2002 | Weaver | |
| 6,494,429 B2 | 12/2002 | Tajima | |
| 6,505,988 B1 | 1/2003 | Oddsen, Jr. | |
| 6,510,049 B2 | 1/2003 | Rosen | |
| 6,517,040 B1 | 2/2003 | Wen | |
| 6,527,466 B1 | 3/2003 | Blier | |
| 6,530,546 B1 | 3/2003 | Cyrell | |
| 6,543,734 B2 | 4/2003 | Yeh | |
| 6,554,238 B1 | 4/2003 | Hibberd | |
| 6,554,242 B2 * | 4/2003 | Kim | 248/371 |
| 6,559,829 B1 | 5/2003 | Matsuo et al. | |
| 6,560,094 B2 | 5/2003 | Schmidt | |
| 6,565,056 B2 | 5/2003 | Lin | |
| 6,575,419 B1 | 6/2003 | Masuda et al. | |
| D477,325 S | 7/2003 | Theis | |
| D477,606 S | 7/2003 | Theis | |
| 6,585,203 B1 | 7/2003 | Euker | |
| 6,592,090 B1 | 7/2003 | Li | |
| 6,594,143 B2 | 7/2003 | Yano et al. | |
| 6,604,722 B1 * | 8/2003 | Tan | 248/276.1 |
| 6,644,609 B1 | 11/2003 | Scott | |
| 6,654,235 B2 | 11/2003 | Imsand | |
| 6,663,064 B1 | 12/2003 | Langner et al. | |
| D485,161 S | 1/2004 | Hutchinson | |
| 6,671,928 B2 | 1/2004 | Huang | |
| 6,672,553 B1 | 1/2004 | Lin | |
| 6,695,270 B1 | 2/2004 | Smed | |
| D488,708 S | 4/2004 | Lam | |
| 6,752,363 B2 | 6/2004 | Boele | |
| D493,800 S | 8/2004 | Pfister | |
| D494,183 S | 8/2004 | Wills | |
| D494,596 S | 8/2004 | Pfister | |
| D494,978 S | 8/2004 | Pfister | |
| D495,713 S | 9/2004 | Pfister | |
| D495,714 S | 9/2004 | Pfister | |
| D496,367 S | 9/2004 | Pfister | |
| D497,537 S | 10/2004 | O'Keene et al. | |
| D503,331 S | 3/2005 | Sjoberg | |
| 6,874,743 B2 | 4/2005 | Watanabe et al. | |
| D505,477 S | 5/2005 | Rager | |
| 6,886,701 B2 | 5/2005 | Hong et al. | |
| 6,889,404 B2 * | 5/2005 | Lu et al. | 16/287 |
| 6,905,101 B1 | 6/2005 | Dittmer | |
| D507,477 S | 7/2005 | Pfister | |
| D508,171 S | 8/2005 | Choo | |
| 6,923,413 B2 | 8/2005 | Dozier | |
| D509,083 S | 9/2005 | Sexton | |
| 6,966,532 B2 | 11/2005 | Ishizaki et al. | |
| D512,903 S | 12/2005 | Gallien | |
| D517,085 S | 3/2006 | Deuschle | |
| 7,018,961 B2 | 3/2006 | Tazaki | |
| 7,028,961 B1 | 4/2006 | Dittmer et al. | |
| D520,017 S | 5/2006 | van Kuijk et al. | |
| D520,794 S | 5/2006 | Grover | |
| 7,063,296 B2 | 6/2006 | Williams | |
| D530,595 S | 10/2006 | Lam et al. | |
| 7,124,984 B2 * | 10/2006 | Yokouchi et al. | 248/125.8 |
| D531,489 S | 11/2006 | Concari et al. | |
| D532,290 S | 11/2006 | David | |
| D533,483 S | 12/2006 | Simmons et al. | |
| 7,152,836 B2 | 12/2006 | Pfister et al. | |
| 7,178,774 B2 | 2/2007 | Kim | |
| 7,178,775 B2 | 2/2007 | Pfister et al. | |
| D537,656 S | 3/2007 | Stenhouse et al. | |
| D538,093 S | 3/2007 | Lee | |
| D538,140 S | 3/2007 | Hau et al. | |
| D538,141 S | 3/2007 | Stenhouse et al. | |
| D538,632 S | 3/2007 | Ly Hau et al. | |
| D539,125 S | 3/2007 | Ly Hau et al. | |
| D539,126 S | 3/2007 | Stenhouse | |
| D539,128 S | 3/2007 | Ly Hau et al. | |
| D539,636 S | 4/2007 | Bremmon | |
| D539,637 S | 4/2007 | Ly Hau et al. | |
| D539,639 S | 4/2007 | Nagle | |
| D540,154 S | 4/2007 | Bremmon | |
| D543,729 S | 6/2007 | Weatherly | |
| D545,604 S | 7/2007 | Eyman et al. | |
| D546,103 S | 7/2007 | Eyman et al. | |
| D547,585 S | 7/2007 | Netto et al. | |
| D549,232 S | 8/2007 | Li et al. | |
| D549,636 S | 8/2007 | Dial | |
| 7,267,314 B1 * | 9/2007 | Erickson | 248/343 |
| 7,269,912 B2 | 9/2007 | Muday et al. | |
| D553,125 S | 10/2007 | Ly Hau et al. | |
| D553,483 S | 10/2007 | Grey | |
| 7,300,029 B2 | 11/2007 | Petrick et al. | |
| D559,658 S | 1/2008 | Wohlford | |
| D560,411 S | 1/2008 | Chung | |
| D560,670 S | 1/2008 | Anderson et al. | |
| D560,671 S | 1/2008 | Muday et al. | |
| D560,672 S | 1/2008 | Muday et al. | |
| 7,316,379 B1 | 1/2008 | Graham | |
| D561,562 S | 2/2008 | Wohlford | |
| D561,775 S | 2/2008 | Wohlford et al. | |
| D563,416 S | 3/2008 | Bremmon | |
| D563,962 S | 3/2008 | Grey | |
| D565,054 S | 3/2008 | Anderson et al. | |
| D565,388 S | 4/2008 | Concari | |
| D565,399 S | 4/2008 | Grey | |
| D570,199 S | 6/2008 | Bremmon | |
| D570,355 S | 6/2008 | Muday et al. | |
| D570,852 S | 6/2008 | Muday et al. | |
| 7,380,760 B2 | 6/2008 | Dittmer | |
| 7,387,286 B2 | 6/2008 | Dittmer et al. | |
| 7,395,996 B2 | 7/2008 | Dittmer | |
| 7,438,269 B2 | 10/2008 | Pfister et al. | |
| 7,445,187 B2 | 11/2008 | Shin | |
| D581,914 S | 12/2008 | Bures et al. | |
| D587,036 S | 2/2009 | Russell | |
| D587,504 S | 3/2009 | Russell | |
| 7,513,474 B2 | 4/2009 | Anderson et al. | |
| 7,537,189 B2 | 5/2009 | Jung et al. | |
| D595,277 S | 6/2009 | Bremmon et al. | |
| D595,702 S | 7/2009 | Bremmon et al. | |
| D610,436 S | 2/2010 | Bremmon et al. | |
| D610,437 S | 2/2010 | Bremmon et al. | |
| D612,182 S | 3/2010 | Bremmon et al. | |
| 7,712,717 B2 | 5/2010 | Burns | |
| 7,731,143 B2 | 6/2010 | Muday et al. | |
| 7,762,757 B2 | 7/2010 | Ueda et al. | |
| 7,841,575 B1 | 11/2010 | Sliger | |
| 7,866,621 B1 | 1/2011 | Walters | |
| 7,963,489 B2 | 6/2011 | O'Keene et al. | |
| 8,456,808 B2 * | 6/2013 | Grey et al. | 361/679.01 |
| 2001/0050327 A1 | 12/2001 | Sweere et al. | |
| 2002/0011544 A1 | 1/2002 | Bosson | |
| 2002/0033436 A1 | 3/2002 | Peng et al. | |
| 2002/0084396 A1 | 7/2002 | Weaver | |
| 2002/0179791 A1 * | 12/2002 | Kwon | 248/284.1 |
| 2002/0179801 A1 | 12/2002 | Kim | |
| 2002/0190180 A1 | 12/2002 | Cotterill | |
| 2003/0042385 A1 | 3/2003 | Hung et al. | |
| 2003/0075653 A1 | 4/2003 | Li | |

(56) References Cited

U.S. PATENT DOCUMENTS

| | | |
|---|---|---|
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011932 A1 | 1/2004 | Duff |
| 2004/0011938 A1 | 1/2004 | Oddsen, Jr. |
| 2004/0056161 A1 | 3/2004 | Ishizaki et al. |
| 2004/0079849 A1 | 4/2004 | Rudolf |
| 2004/0211870 A1 | 10/2004 | Bremmon et al. |
| 2004/0232298 A1 | 11/2004 | Bremmon |
| 2004/0232301 A1 | 11/2004 | Bremmon et al. |
| 2004/0245416 A1 | 12/2004 | Attee |
| 2004/0245420 A1 | 12/2004 | Pfister et al. |
| 2005/0051688 A1 | 3/2005 | Dittmer |
| 2005/0087661 A1 | 4/2005 | Rabenius |
| 2005/0110911 A1 | 5/2005 | Childrey et al. |
| 2005/0133678 A1 | 6/2005 | Dittmer |
| 2005/0152102 A1 | 7/2005 | Shin |
| 2005/0194498 A1 | 9/2005 | Burns et al. |
| 2005/0236542 A1* | 10/2005 | O—Neill .................. 248/286.1 |
| 2005/0236548 A1 | 10/2005 | Maruta |
| 2005/0263659 A1 | 12/2005 | Pfister et al. |
| 2006/0006296 A1 | 1/2006 | Morita |
| 2006/0065800 A1 | 3/2006 | Bremmon |
| 2006/0065806 A1* | 3/2006 | Shin .............................. 248/325 |
| 2006/0186294 A1 | 8/2006 | VanGroesen et al. |
| 2006/0231711 A1* | 10/2006 | Shin .................. 248/291.1 |
| 2006/0244870 A1 | 11/2006 | Yamato et al. |
| 2006/0291152 A1* | 12/2006 | Bremmon ................. 361/681 |
| 2007/0007413 A1 | 1/2007 | Jung et al. |
| 2007/0023599 A1 | 2/2007 | Fedewa |
| 2007/0041150 A1 | 2/2007 | Short et al. |
| 2007/0090250 A1 | 4/2007 | O'Keene |
| 2007/0103856 A1 | 5/2007 | She |
| 2007/0158515 A1 | 7/2007 | Dittmer et al. |
| 2007/0176067 A1 | 8/2007 | Monaco |
| 2007/0181762 A1 | 8/2007 | Dittmer |
| 2007/0193481 A1 | 8/2007 | Wiebe et al. |
| 2007/0235614 A1 | 10/2007 | O'Keene et al. |
| 2007/0258196 A1 | 11/2007 | Koskinen et al. |
| 2008/0054147 A1 | 3/2008 | Muday et al. |
| 2008/0068784 A1 | 3/2008 | Bouissiere |
| 2008/0156949 A1 | 7/2008 | Schuller et al. |
| 2008/0156953 A1 | 7/2008 | Oh et al. |
| 2008/0237414 A1* | 10/2008 | Lien et al. .................. 248/125.2 |
| 2008/0265113 A1* | 10/2008 | Lin et al. .................... 248/176.3 |
| 2008/0315049 A1 | 12/2008 | Bailo et al. |
| 2009/0050763 A1 | 2/2009 | Dittmer |
| 2009/0084918 A1 | 4/2009 | Pfister et al. |
| 2009/0159768 A1 | 6/2009 | Oh |
| 2010/0149736 A1 | 6/2010 | Dittmer et al. |
| 2011/0216251 A1 | 9/2011 | Perez Perez et al. |

FOREIGN PATENT DOCUMENTS

| | | |
|---|---|---|
| DE | 29809300 U1 | 9/1998 |
| DE | 20200148 U1 | 7/2002 |
| EP | 2100446 A1 | 9/2009 |
| GB | 1280913 A | 7/1972 |
| GB | 994246 | 8/1980 |
| JP | 2000-214787 | 8/2000 |
| JP | 3078557 U | 4/2001 |
| JP | 2001-175188 A | 6/2001 |
| JP | 2006-071769 A | 3/2006 |
| KR | 10-2002-0035062 | 5/2002 |
| KR | 10-2002-0071289 | 9/2002 |
| KR | 10-2002-0092699 | 12/2002 |
| KR | 10-2003-0094458 | 12/2003 |
| KR | 10-2004-0021741 | 3/2004 |
| KR | 10-2004-0037618 | 5/2004 |
| KR | 10-2005-0058738 | 6/2005 |
| KR | 10-2006-0034351 | 4/2006 |
| KR | 10-2007-0096626 A | 10/2007 |
| KR | 10-2007-0120689 A | 12/2007 |
| WO | WO00/73697 A1 | 12/2000 |
| WO | WO02/42681 A1 | 5/2002 |
| WO | WO03/050786 A1 | 6/2003 |
| WO | WO2004/070257 A1 | 8/2004 |
| WO | WO2006/044969 A1 | 4/2006 |
| WO | WO2006/127826 A2 | 11/2006 |
| WO | WO2006/133188 A2 | 12/2006 |
| WO | WO-2008/044954 A1 | 4/2008 |
| WO | WO2008/053242 A1 | 5/2008 |
| WO | WO-2008/083396 A1 | 7/2008 |
| WO | WO-2008/085889 A1 | 7/2008 |
| WO | WO2008/085889 A1 | 7/2008 |
| WO | WO-2009/033133 A1 | 3/2009 |
| WO | WO2010/027945 A2 | 3/2010 |
| WO | WO2010/080925 A1 | 7/2010 |

OTHER PUBLICATIONS

File History for U.S. Appl. No. 12/712,357, filed Feb. 25, 2010, Published Jun. 17, 2010, as U.S. Publication No. 2010/0149736 A1.

File History for U.S. Appl. No. 12/522,142, filed Nov. 10, 2009, Published Apr. 15, 2010, as U.S. Publication No. 2010/0091438A1.

File History for U.S. Appl. No. 12/348,799, filed Jan. 5, 2009, Published Aug. 13, 2009, as U.S. Publication No. 2009/0200439.

File History for U.S. Appl. No. 12/811,684, filed Nov. 1, 2010, Published Feb. 24, 2011, as U.S. Publication No. 2011/0043978.

File History for U.S. Appl. No. 13/061,910, filed May 23, 2011, Published Sep. 29, 2011, as U.S. Publication No. 2011/0234926.

European Search Report re Application Ser. No. EP08712990, Dated Nov. 10, 2009, 5 Pgs.

PCT Search Report and Written Opinion for International Application No. PCT/US2008/000117, Mailed Jun. 11, 2008, 12 Pgs.

Office Action cited in Chinese Patent Application No. 200880000229.8, Dated Jul. 22, 2011, 4 Pgs.

Examiner's First Report Cited in Australian Application No. 2008205387, Dated Apr. 14, 2011, 4 Pgs.

International Search Report for PCT/US2009/030147, Mailed Mar. 23, 2009, 1 Pg.

*SANUS VISIONMOUNT* Catalog, copyright Mar. 2007, 40 Pgs.

Chief Manufacturing, Inc., *Full-Line Product Guide* 2004, Jan. 2004, 64 Pgs.

Chief Manufacturing, Inc., *The Focus: Presentation Support Solutions*, Jan. 2003, 80 Pgs.

Chief Manufacturing, Inc., *The Focus: Presentation Support Solutions*, Full-Line Product Guide, Apr. 2002, 66 Pgs.

Mounts by PDR, A Division of David Engineering, *Panel Display Pivot Mount*, 4 Pgs.

FIMCO, *Wall Mount Kit for Plasma TV Screens*, Nov. 2003, 12 Pgs.

Peerless, *SmartMount™ Universal Tilt Wall Mount for 32" to 50" Plasma and LCD Flat Panel Screens*, 2006, 2 Pgs.

Peerless, *SmartMount™ Universal Tilt Wall Mount for 61" to 102" Plasma and LCD Flat Panel Screens*, 2006, 2 Pgs.

Peerless, *SmartMount™ Universal Tilt Wall Mount for 42" to 71" Plasma and LCD Flat Panel Screens*, 2006, 2 Pgs.

Peerless, *SmartMount™ Universal Tilt Wall Mount for 32" to 60" Plasma and LCD Flat Panel Screens*, 2006, 2 Pgs.

Peerless, *SmartMount™ Universal Tilt Wall Mount for 23" to 46" LCD Flat Panel Screens*, 2006, 2 Pgs.

Peerless, *SmartMount™ Universal Flat Wall Mount for 61" to 102" Plasma and LCD Flat Panel Screens*, 2006, 2 Pgs.

Peerless, *SmartMount™ Universal Flat Wall Mount for 42" to 71" Plasma and LCD Flat Panel Screens*, 2006, 2 Pgs.

Peerless, *SmartMount™ Universal Flat Wall Mount for 32" to 60" Plasma and LCD Flat Panel Screens*, 2006, 2 Pgs.

Peerless, *SmartMount™ Universal Flat Wall Mount for 23" to 46" LCD Flat Panel Screens*, 2006, 2 Pgs.

Peerless, *SmartMount™ Universal Tilt Wall Mount for 22" to 49" Screens*, Mar. 31, 2005, 12 Pgs.

Viewsonic Mount, 2005, 1 Pg.

Hitachi Mount, 2005, 1 Pg.

Instruction Manual for Superior Mount, dated Feb. 1, 2007, 12 Pgs.

(56) References Cited

OTHER PUBLICATIONS

Chief Manufacturing, Inc., Full Line Catalog, *Mounting Solutions Product Guide*, Copyright Jun. 2006, 122 Pgs.
EP Communication/Supplementary Search Report re European Application No. EP09812096, Dated Oct. 28, 2011, 6 Pgs.
EP Communication/Supplementary Search Report re European Application No. EP09700554, Dated Nov. 9, 2011, 6 Pgs.
PCT Notification of Transmittal of International Search Report, Search Report and Written Opinion re PCT/US2009/055535, Dated Apr. 2, 2010, 11 Pgs.
Extended European Search Report, EP Application No. 10729518.0-1751/2380346, Dated Mar. 28, 2013, 8 Pgs.
Second Chinese Office Action for Chinese Application No. 201080004121.3 dated Sep. 3, 2013. English Translation provided.

* cited by examiner

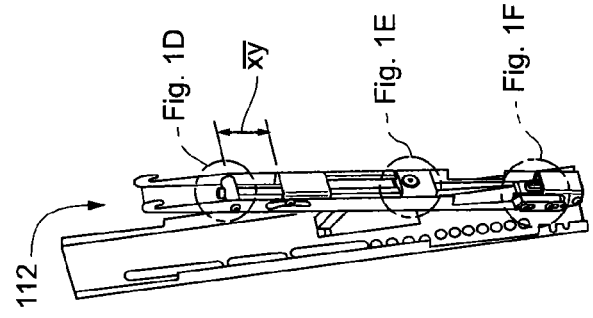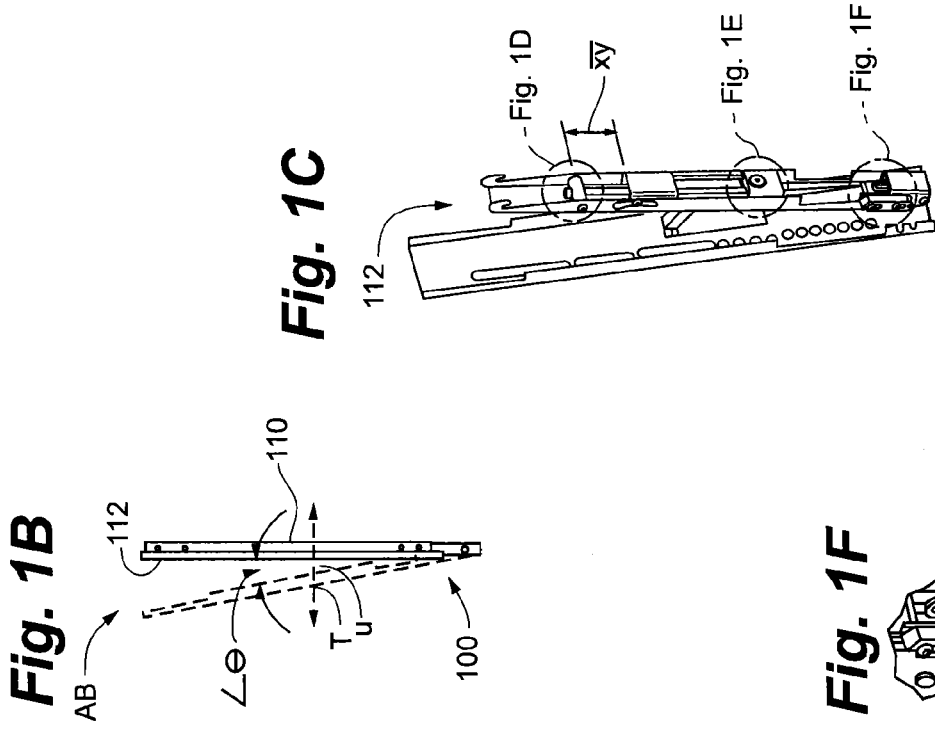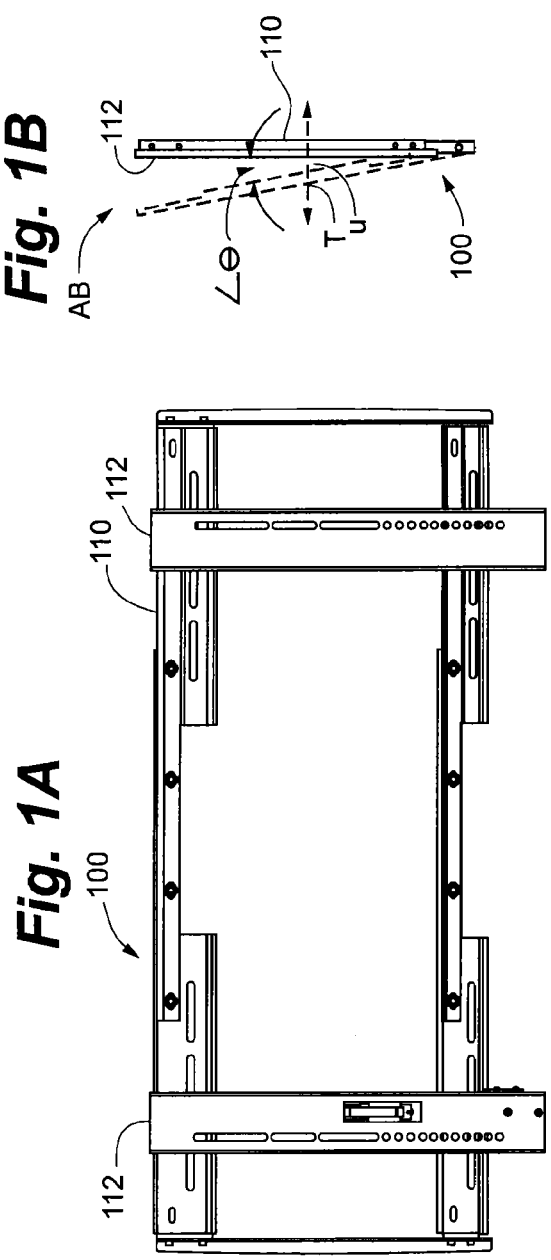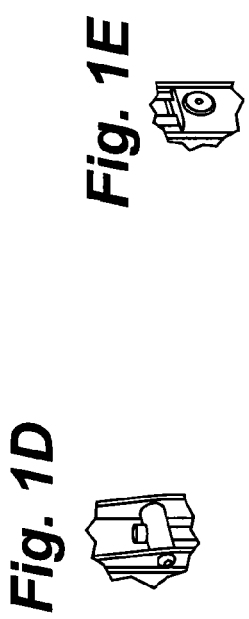

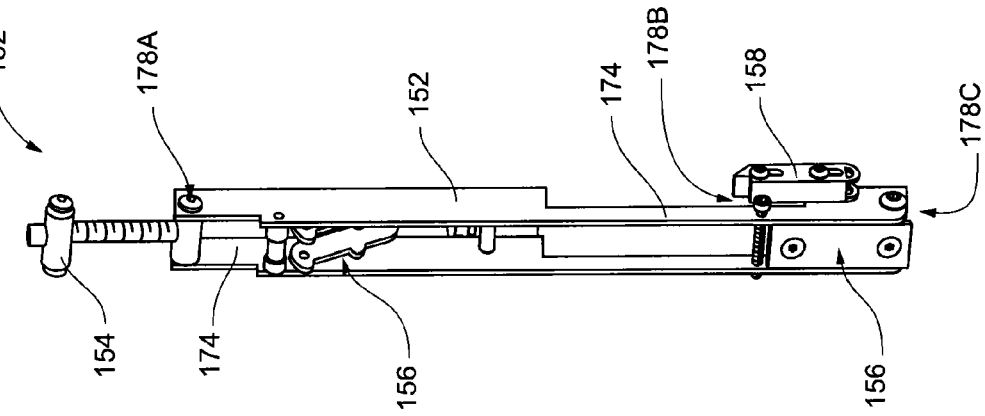
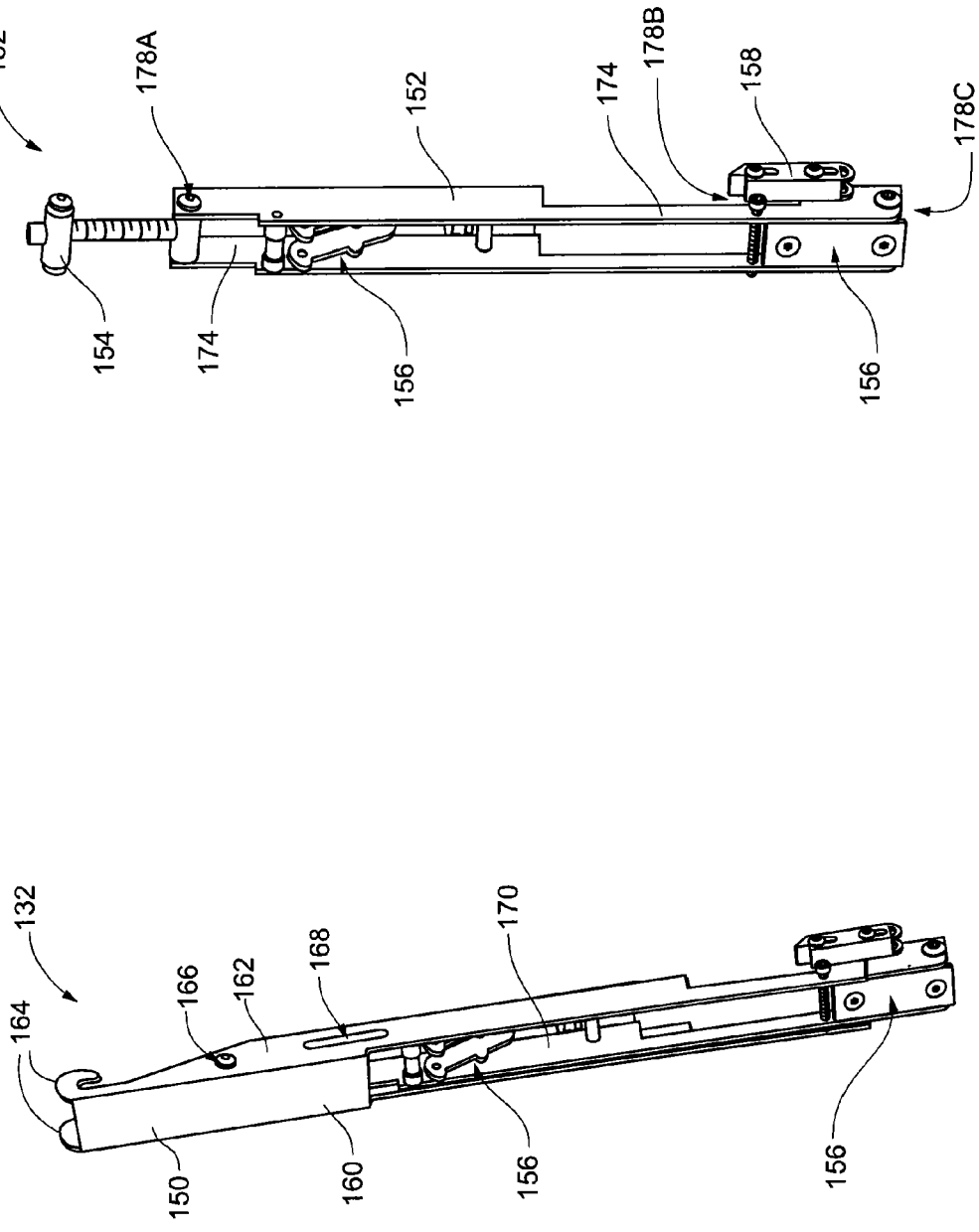

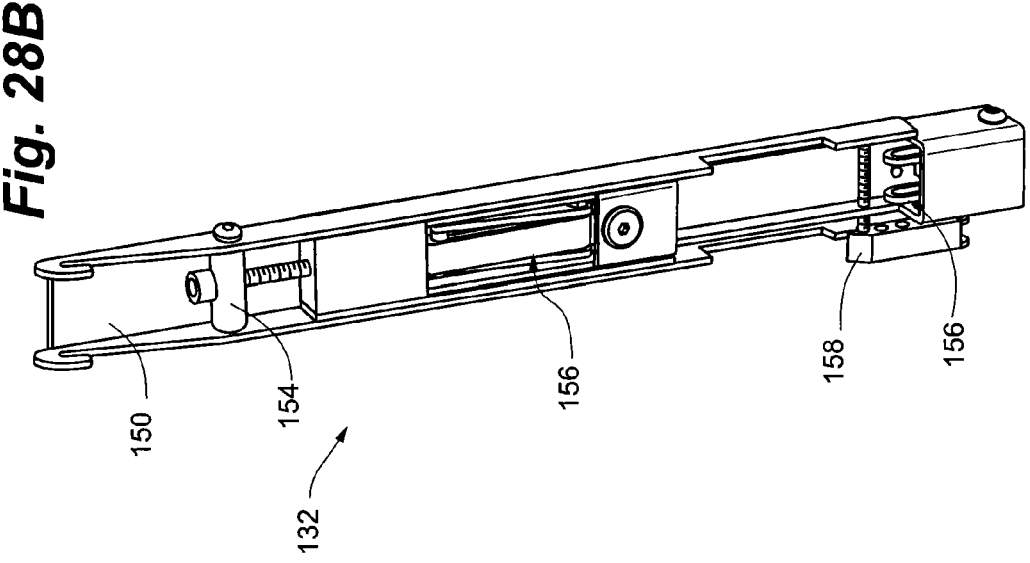
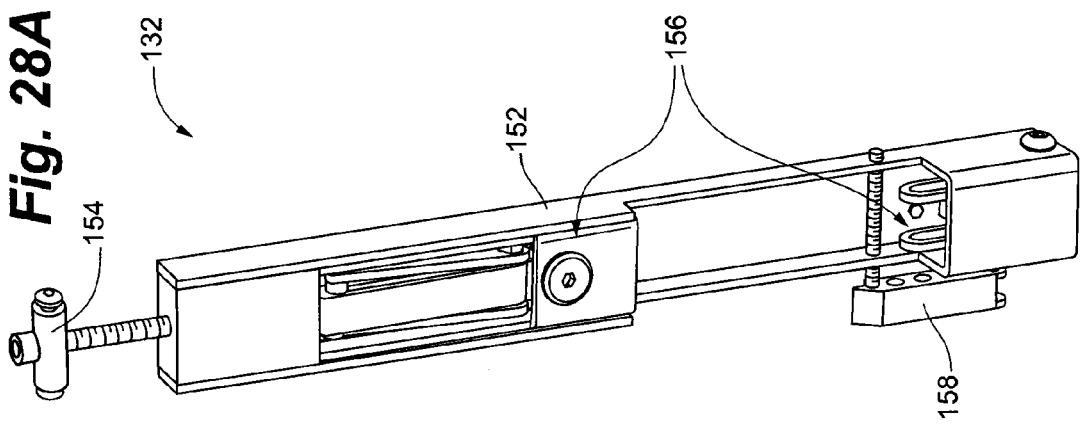

DISPLAY MOUNT WITH ADJUSTABLE POSITION TILT AXIS

RELATED APPLICATIONS

The application claims the benefit of U.S. Provisional Application No. 61/143,135, entitled DISPLAY MOUNT WITH ADJUSTABLE POSITION TILT AXIS, filed Jan. 7, 2009, said application being hereby fully incorporated herein by reference.

FIELD OF THE INVENTION

The present invention relates to the mounting systems for flat-panel displays, and, more particularly, to adjustable-width mounting systems for tilt-positioning of flat panel displays.

BACKGROUND OF THE INVENTION

An attribute of modern flat-panel electronic displays that makes them highly desirable to consumers is the aesthetic appeal of a very flat device that has the appearance of a framed photo or painting when hung from a wall. This same attribute is also desirable in that floor and interior space taken up by the display is minimal.

The flat panel display is typically mounted on a structure, such as, for example, a wall. With current flat panel display technology, however, best viewing quality is typically achieved when the screen is viewed at as near as possible to a ninety degree angle from the plane of the screen. Liquid crystal displays will often appear perceptibly darker at the more oblique angles. In other cases, particularly with plasma displays, glare from the screen surface may impair viewing. Consequently, it is desirable to have the ability to selectively adjust the angle of the flat panel display relative to the mounting structure to achieve optimum viewing.

Numerous wall-mounting devices for flat panel displays have been developed so as to enable tilt and/or swing positioning of the display. Examples of such mounting devices are disclosed, for example, in U.S. Pat. Nos. 6,905,101, 7,028,961, and 7,152,836, all of which are owned by the owner of the present invention and are hereby fully incorporated herein by reference. Various positioning devices have been used, such as friction based hinges, mechanical linkages with springs or other biasing devices, and various mechanical latches. These friction-based devices should be sufficiently strong to hold a relatively heavy flat panel displays while being relatively easy to operate in order to achieve proper functionality and be user-friendly.

A drawback of traditional friction-based devices and mechanical latches is they often cannot be adjusted by a single operator to adjust the viewing angle of a mounted flat-panel display. In particular, a first person may be required to hold the flat panel display at the correct angle while a second person performs the adjustment of the mounting device. Movement in the upward direction often requires the operator to lift a substantial portion of the weight of the flat panel display. In some instances, the operator must also overcome the resistance of the positioning device.

In addition, the hinge and pivot joints used in existing devices typically enable positioning of the display about only one axis per joint. The degree of display position adjustability of such devices is limited by the number of joints that can be economically and practically provided.

What is needed in the industry is a low-cost, easy to operate, and relatively maintenance-free system for mounting and positioning a flat panel display that also provides for selective adjustability of the viewing angle once the flat-panel display has been mounted.

SUMMARY OF THE INVENTION

The present invention is generally directed to apparatus, systems, and methods for mounting flat panel displays. In an embodiment, a display mount includes a wall interface that can be attached on a wall and a display interface that can be attached to a flat panel display. The width of the wall interface can be adjusted to accommodate flat panel display of different sizes. The display interface can be positioned on the mounting interface and adjusted to achieve a desired viewing angle of flat panel display. The display mount enables the flat panel display to be self balancing at any point along the tilt travel of the display and avoids contact between the wall and the display when the display is tilted.

Once mounted onto the display mount, the flat panel display is self balancing within a finite tilt range. In particular, as the orientation of the flat panel display is adjusted through the finite tilt range, the display interface operates such that the center of gravity of the flat panel display moves along a substantially horizontal axis. The display mount can thereby be adjusted with minimal effort and can substantially maintain the tilted position of the flat panel.

To accommodate flat panel display of different thicknesses which may have centers of gravity positioned at varying distances from the display interface when attached to the mount, the display interface of the display mount includes a variable pitch adjuster for fine-tuning the axis of rotation of a mounted flat panel display. In particular, the position of the axis of rotation of the display, which is located forward and slightly below the mount, may be adjusted with the variable pitch adjuster mechanism. By appropriately positioning the axis of rotation with the variable pitch adjuster, the center of gravity of the display can be made to shift in a substantially horizontal plane when tilted. Adjusting the variable pitch adjuster can also minimize the possibility of contact between the wall and the flat panel display during tilting.

To allow for further adjustment of the viewing angle and wall positioning of a flat panel display, display mount also includes a vertical height adjustment mechanism. In particular, adjustment of vertical height adjustment mechanism allows the position of flat panel display to be adjusted in a generally vertical direction without the need to reposition the display mount on the wall.

BRIEF DESCRIPTION OF THE DRAWINGS

The invention may be more completely understood in consideration of the following detailed description of various embodiments of the invention in connection with the following drawings, in which:

FIG. 1A is a front plan view of a display mount according to an embodiment of the present invention;

FIG. 1B is a side plan view of a display mount according to an embodiment of the present invention;

FIG. 1C is a rear perspective view of an adjustable display interface of a display mount according to an embodiment of the present invention;

FIG. 1D is a fragmentary view of a portion of the display interface of FIG. 1C;

FIG. 1E is a fragmentary view of another portion of the display interface of FIG. 1 C;

FIG. 1F is a fragmentary view of another portion of the display interface of FIG. 1C;

FIG. 27A is front perspective view of an operator assembly of a display interface according to an embodiment of the present invention;

FIG. 27B is a front perspective view of the operator assembly of FIG. 37A without a hanger plate;

FIG. 28A is a rear perspective view of an operator assembly of a display interface according to an embodiment of the present invention;

FIG. 28B is a rear perspective view of the operator assembly of FIG. 38A without a hanger plate;

Figure 2:
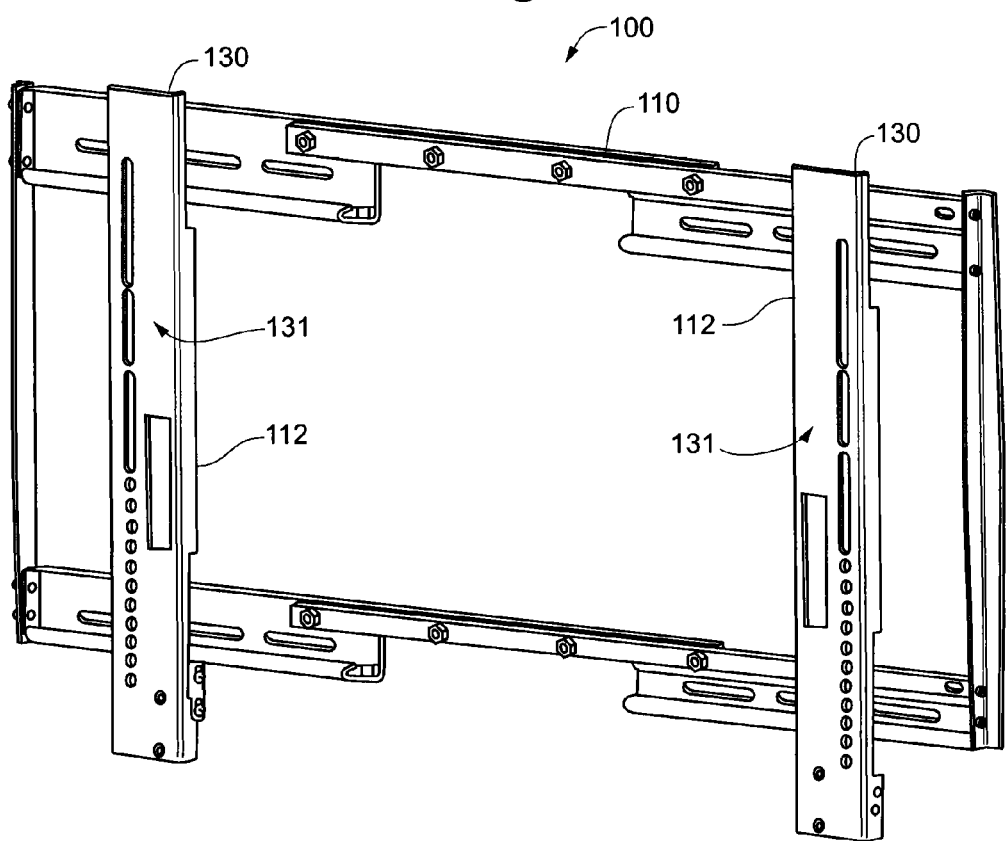
FIG. 2 is a front perspective view of a display mount according to an embodiment of the present invention in a wide position.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 5:
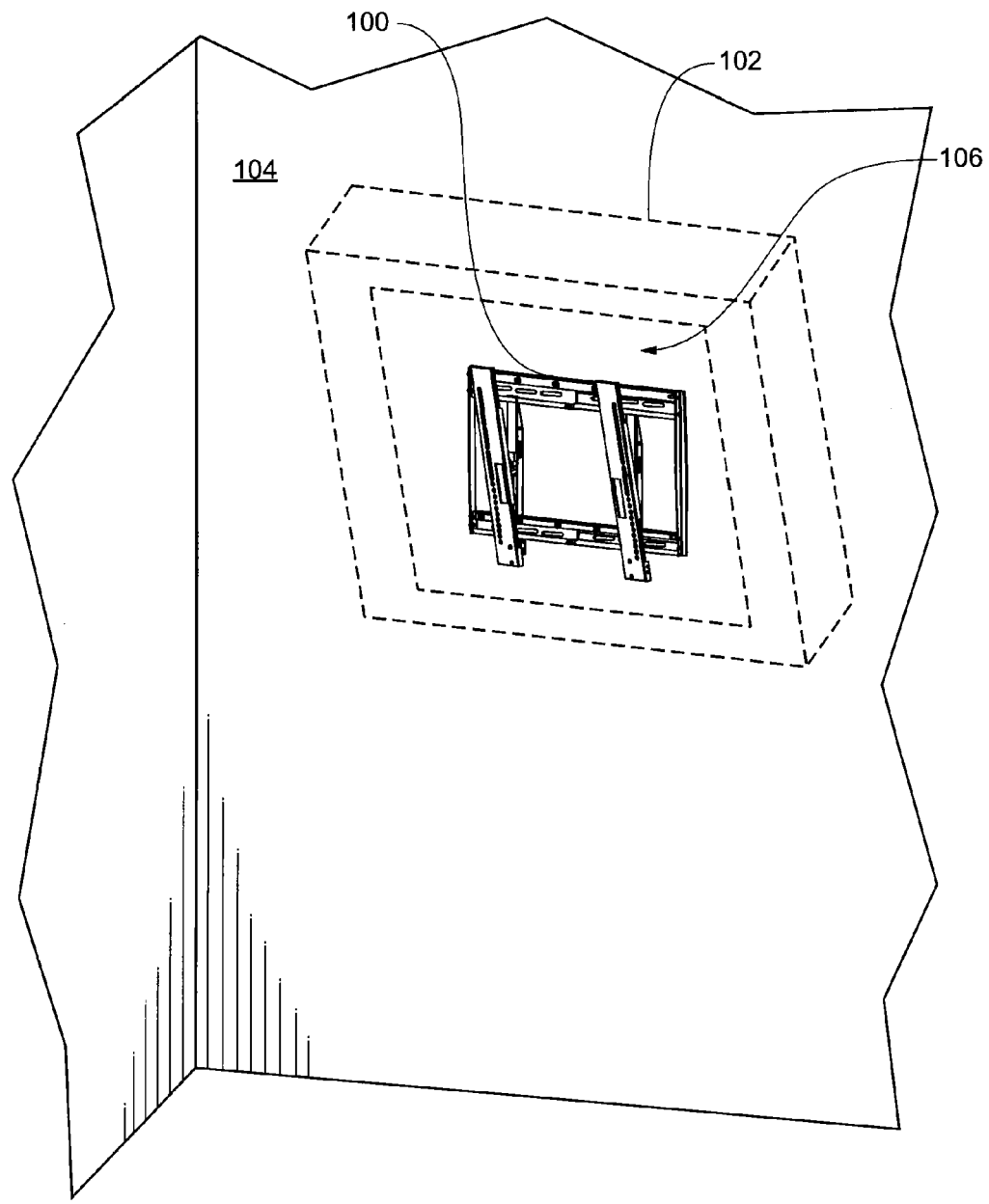
FIG. 5 is a front perspective view of display mount according to an embodiment of the present invention mounted to a wall and a flat-panel display.
Figure 6:
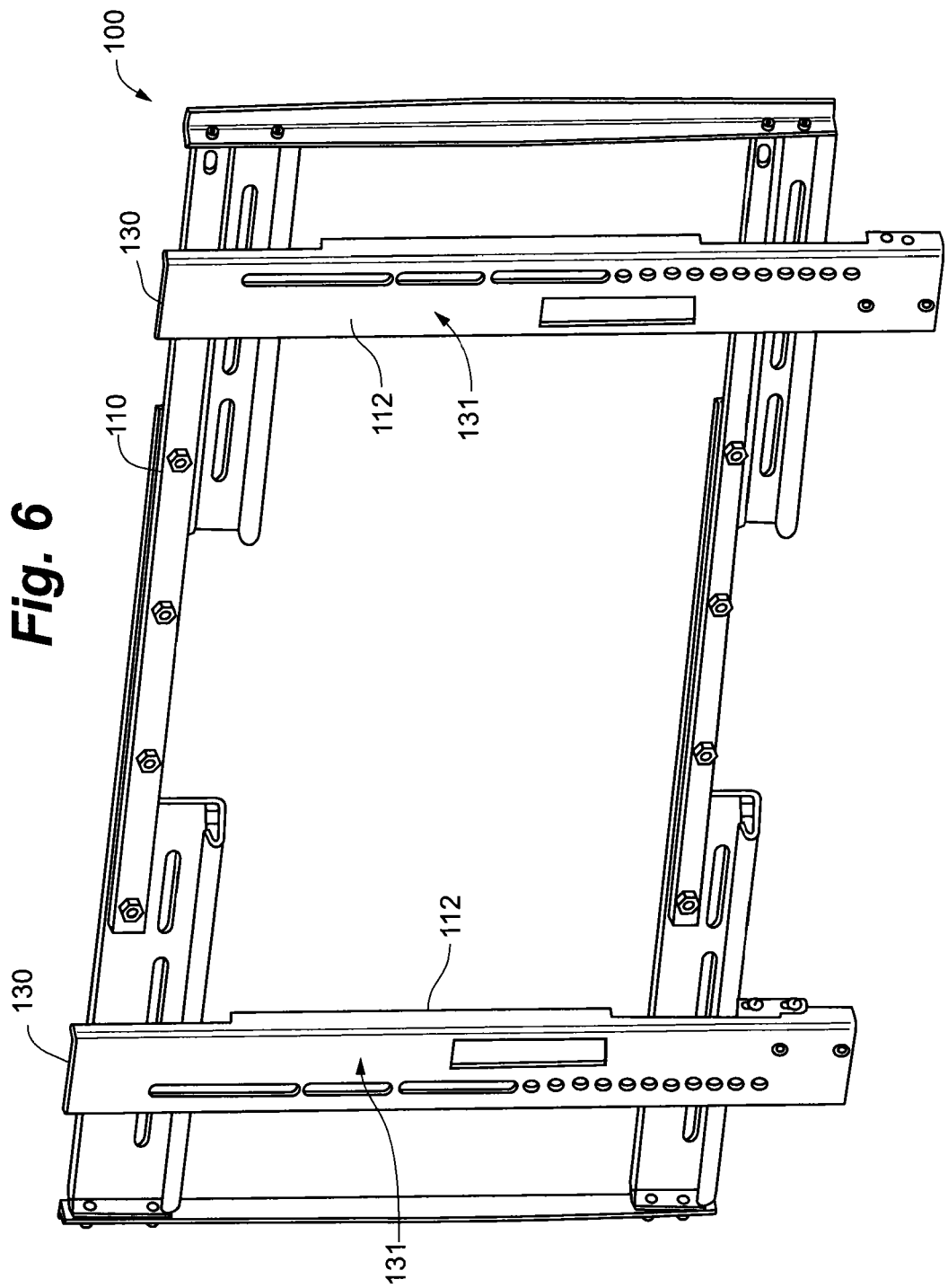
FIG. 6 is a front perspective view of display mount according to an embodiment of the present invention in a wide position.
Figure 7:
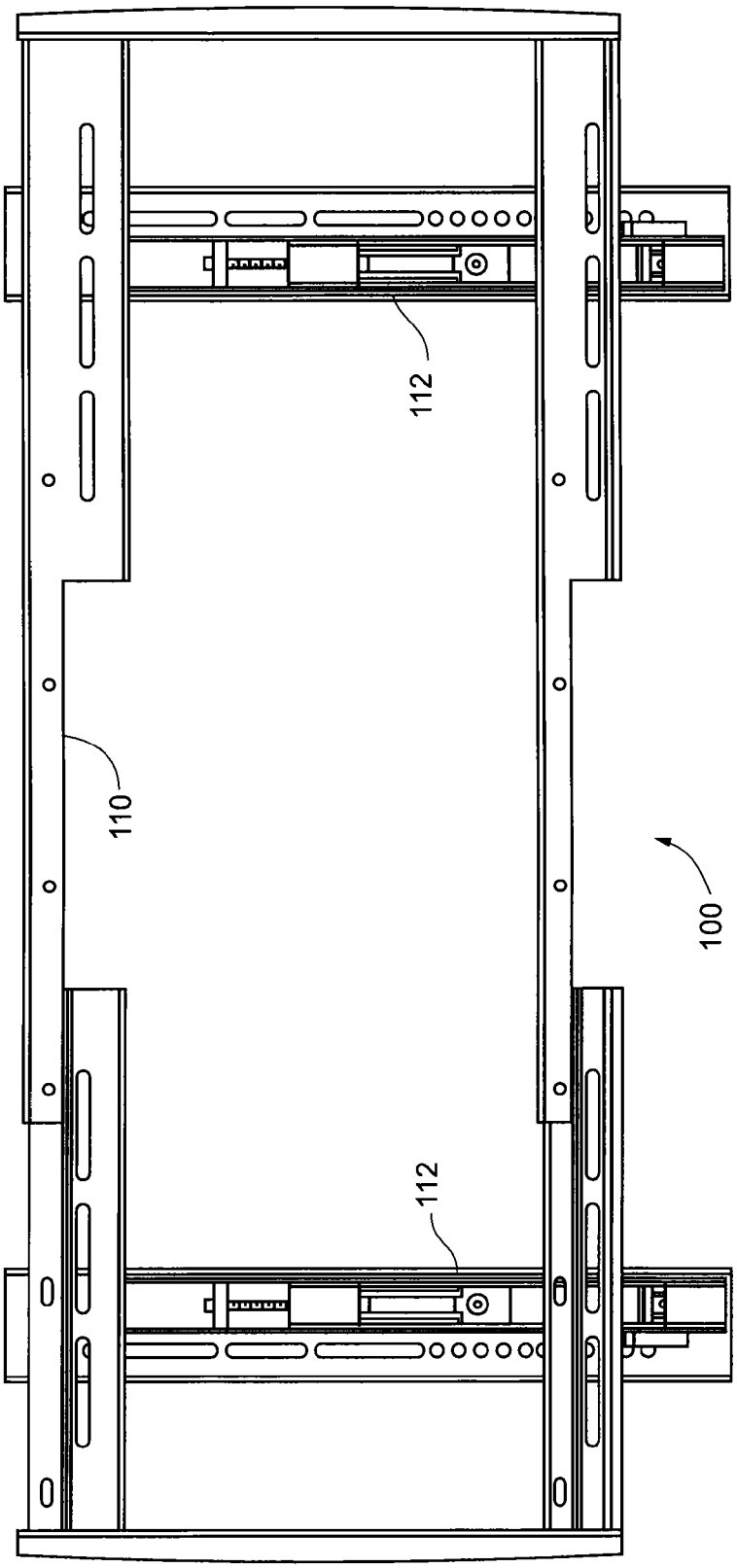
FIG. 7 is a rear plan view of a display mount according to an embodiment of the present invention in a wide position.
Figure 8:
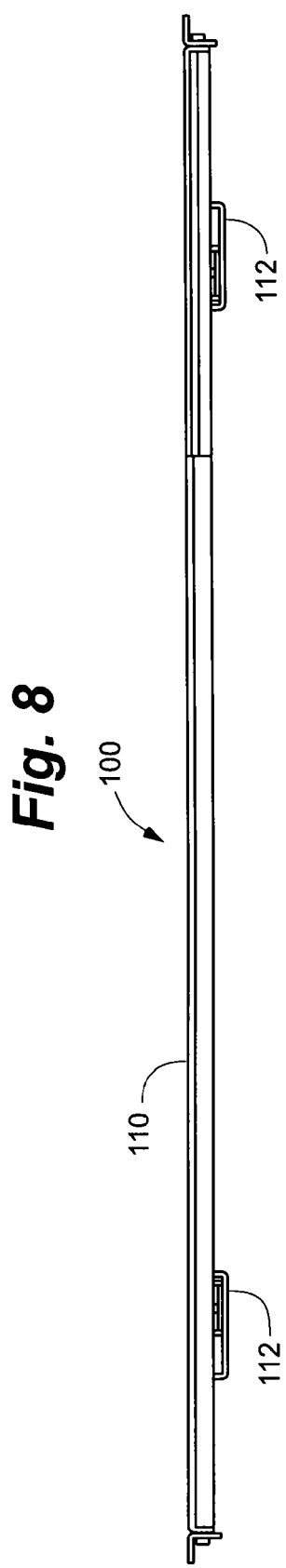
FIG. 8 is a top plan view of a display mount according to an embodiment of the present invention in a wide position.
Figure 9:
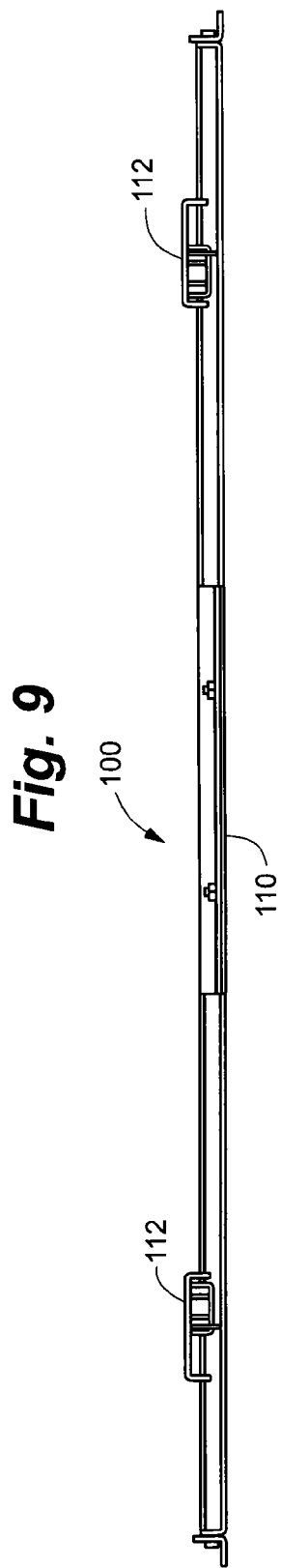
FIG. 9 is a bottom plan view of a display mount according to an embodiment of the present invention in a wide position.
Figure 10:
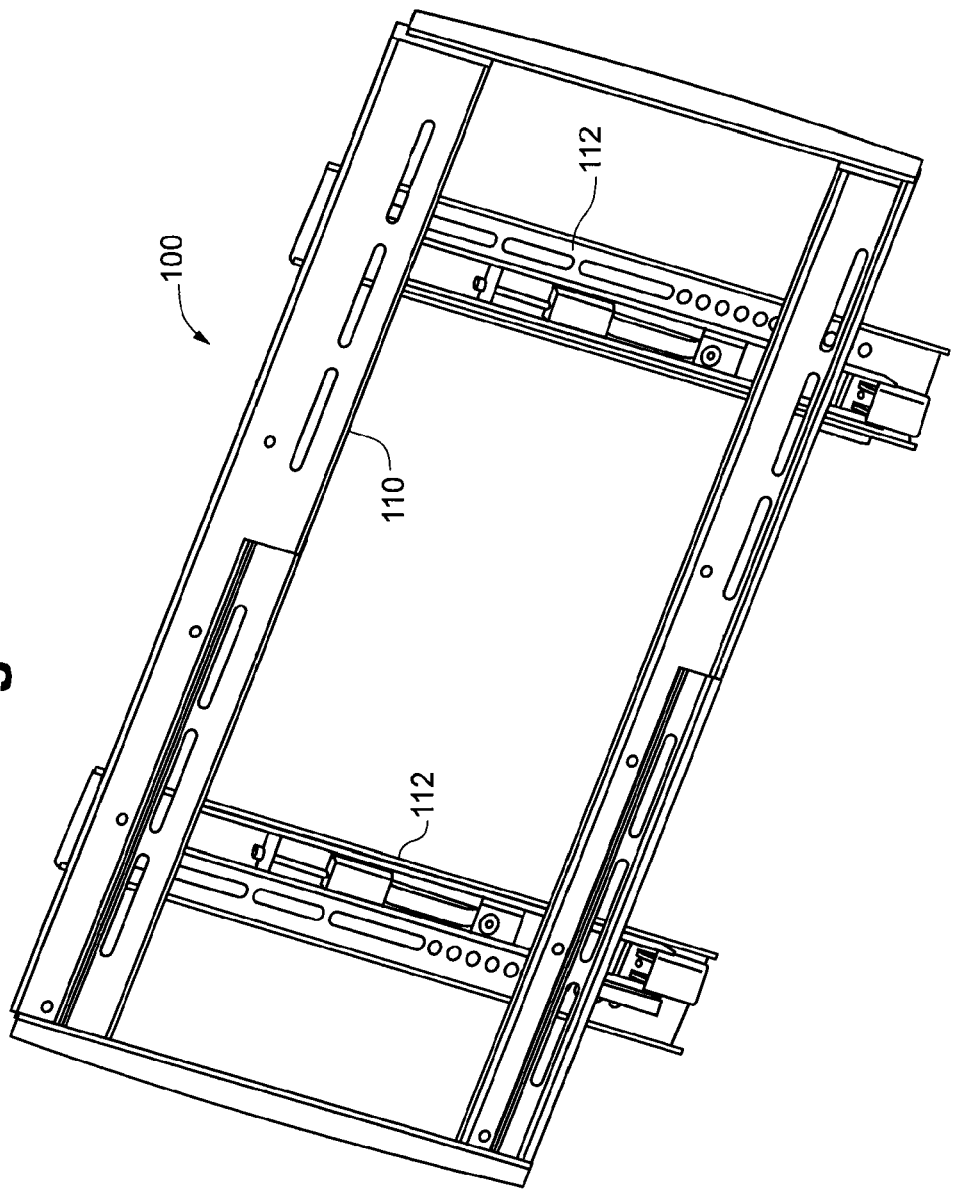
FIG. 10 is a rear perspective view of a display mount according to an embodiment of the present invention in a narrow position.
Figure 11:
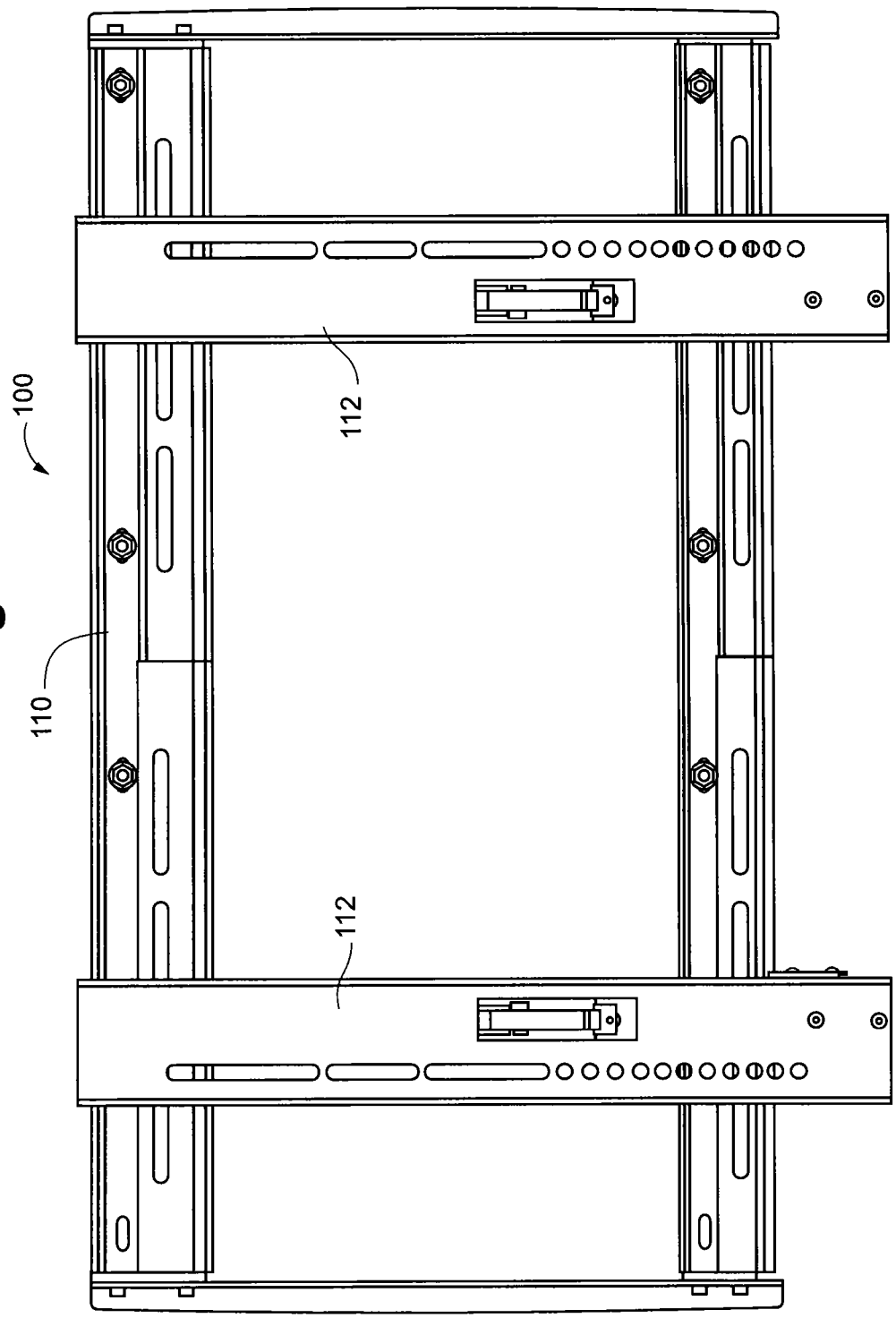
FIG. 11 is a front plan view of a display mount according to an embodiment of the present invention in a tilted position.
Figure 12:
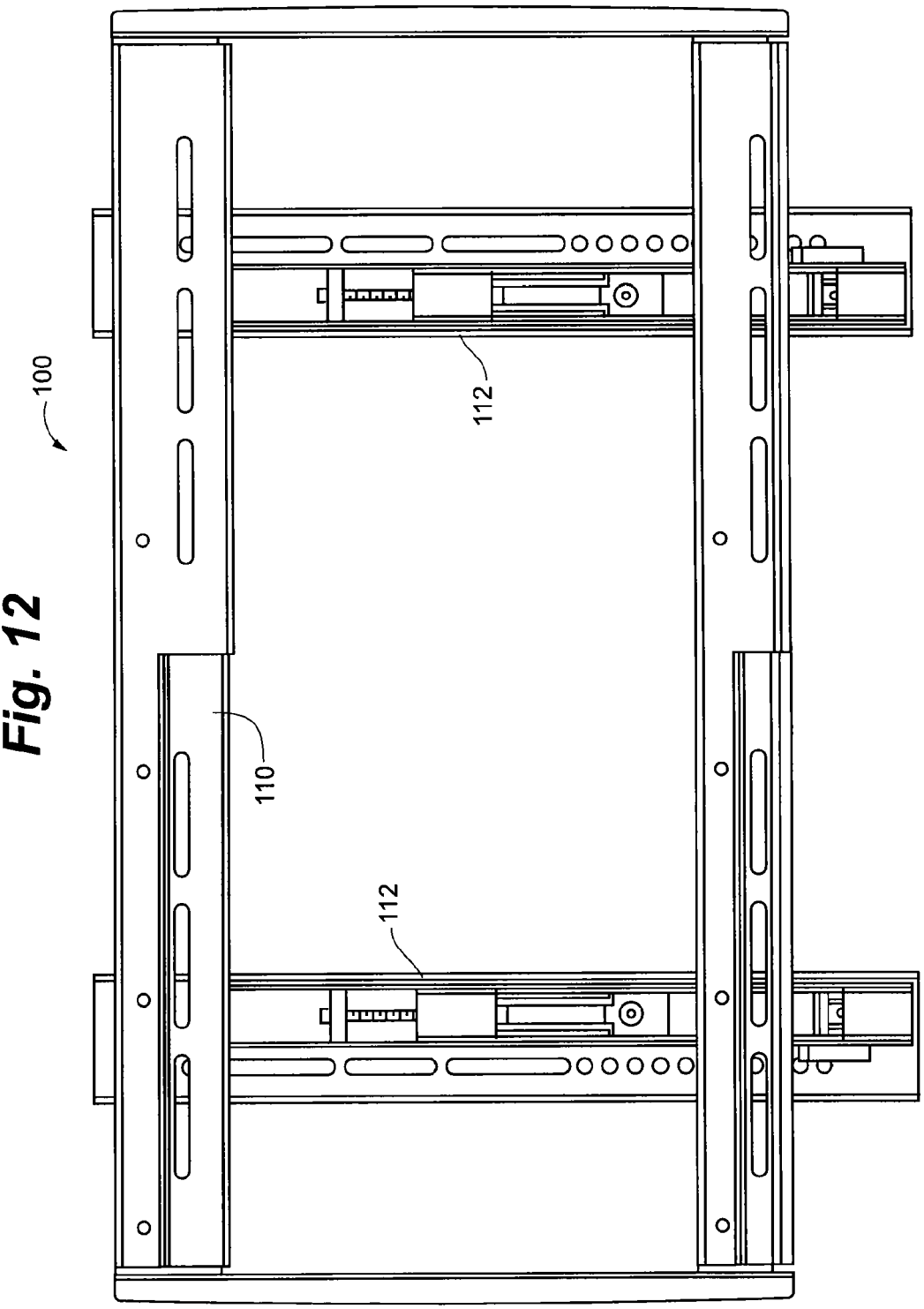
FIG. 12 is a rear plan view of a display mount according to an embodiment of the present invention in a narrow position.
Figure 13:
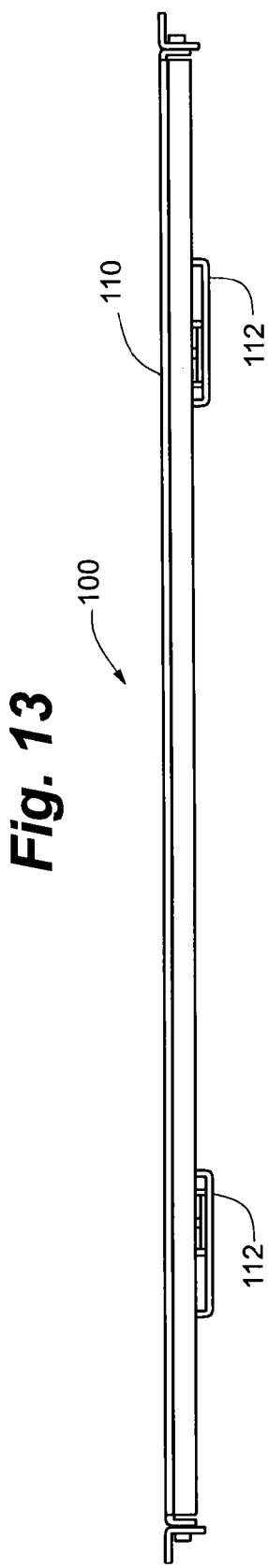
FIG. 13 is a top plan view of a display mount according to an embodiment of the present invention in a narrow position.
Figure 14:
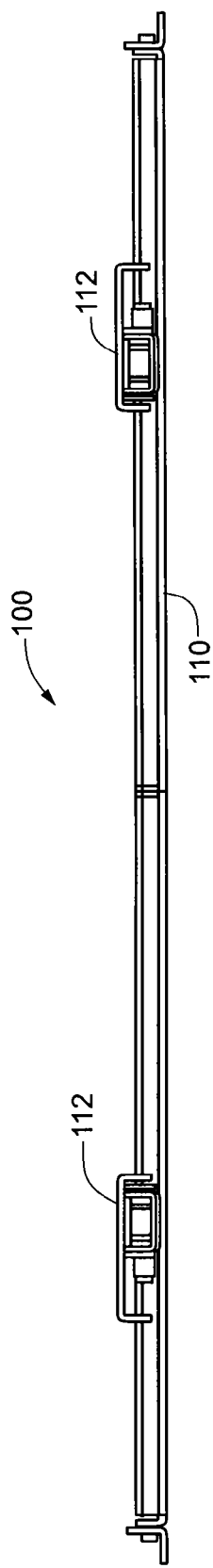
FIG. 14 is a bottom plan view of a display mount according to an embodiment of the present invention in a narrow position.
Figure 15:
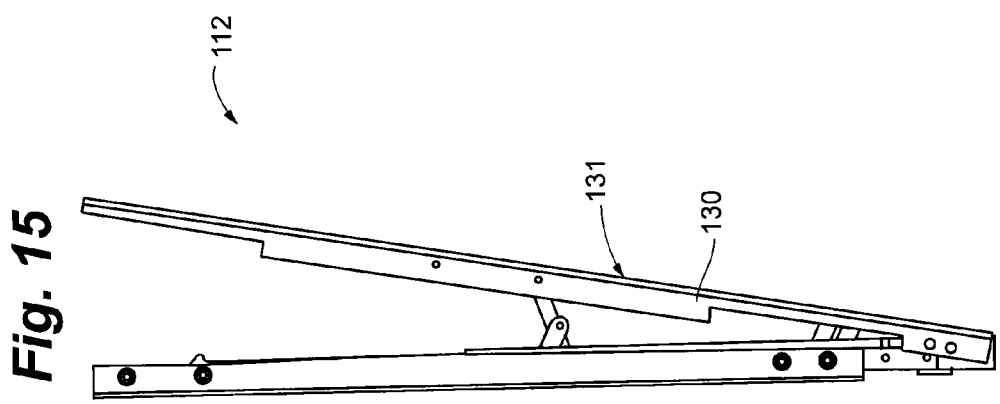
FIG. 15 is a side plan view of a display mount according to an embodiment of the present invention in a tilted position.
Figure 16:
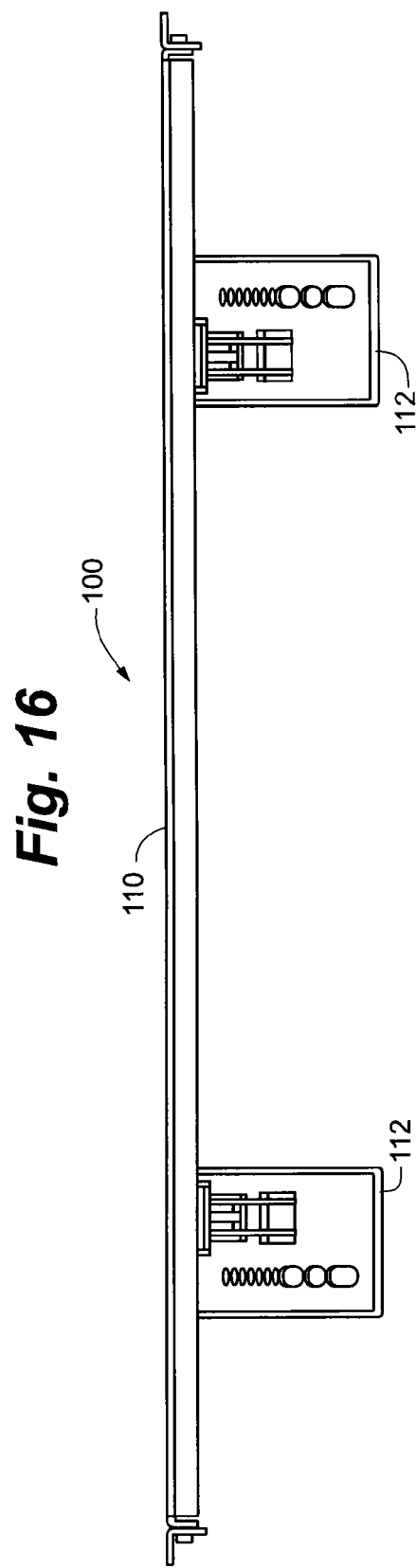
FIG. 16 is top plan view of a display mount according to an embodiment of the present invention in a tilted position.
Figure 17:
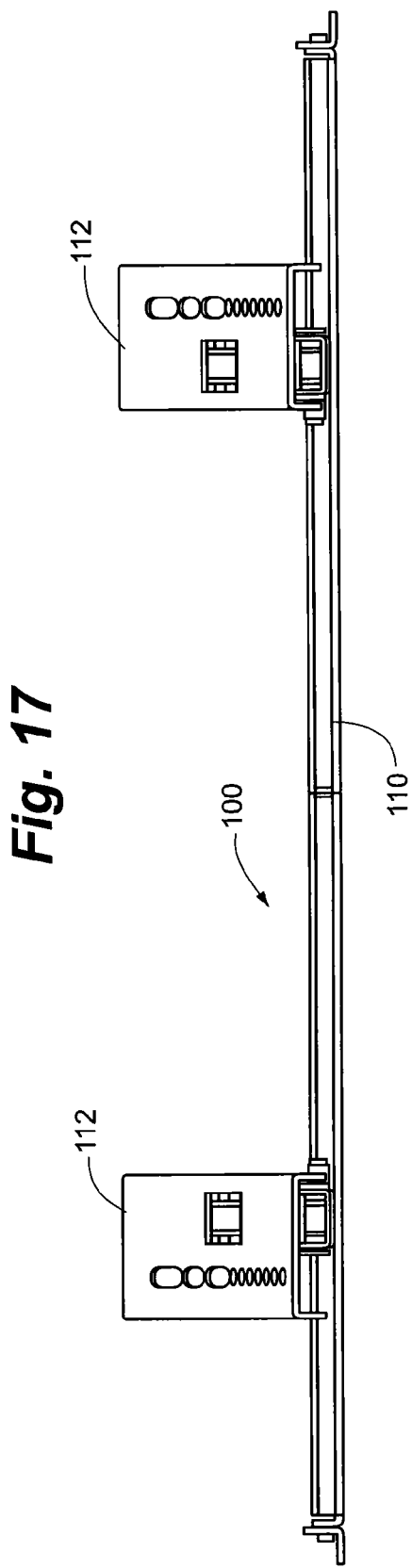
FIG. 17 is a bottom plan view of a display mount according to an embodiment of the present invention in a tilted position.
Figure 18:
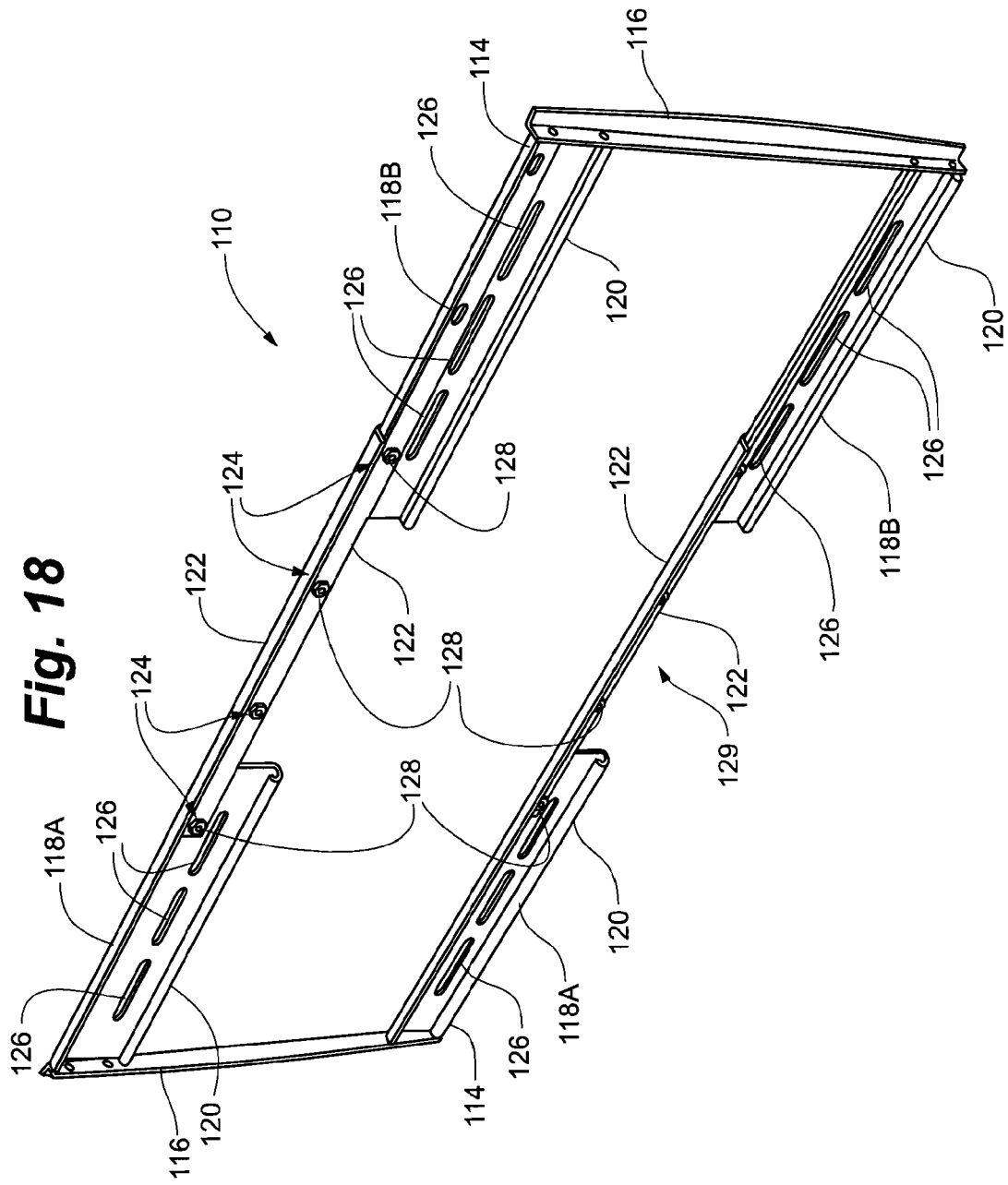
FIG. 18 is front perspective view of a wall interface of a display mount according to an embodiment of the present invention in a wide position.
Figure 19:
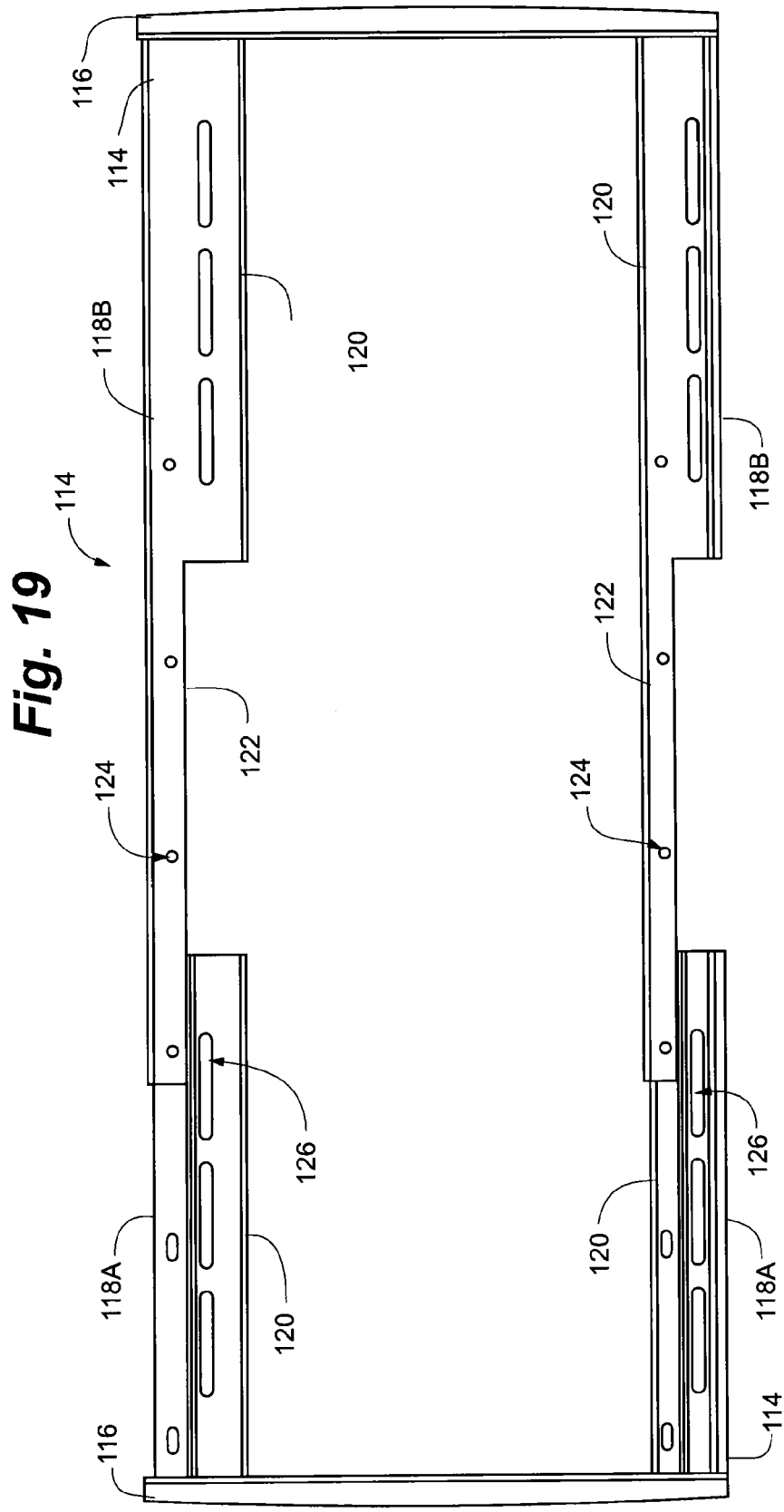
FIG. 19 is a front plan view of a wall interface of a display mount according to an embodiment of the present invention in a wide position.

Referring now to FIG. 1A, display mount 100 according to an embodiment of the invention is depicted. Although display mount 100 can be used for any number of purposes, display mount 100 can used to mount flat panel display 102 to wall 104 according to an embodiment, as depicted in FIG. 5. Display mount 100 can be adjusted to accommodate flat panel displays 102 of different widths, vary an observer's viewing angle of screen 106 of flat panel display 102, and fine tune the vertical positioning of flat panel display 102 on wall 104.

Figure 21:
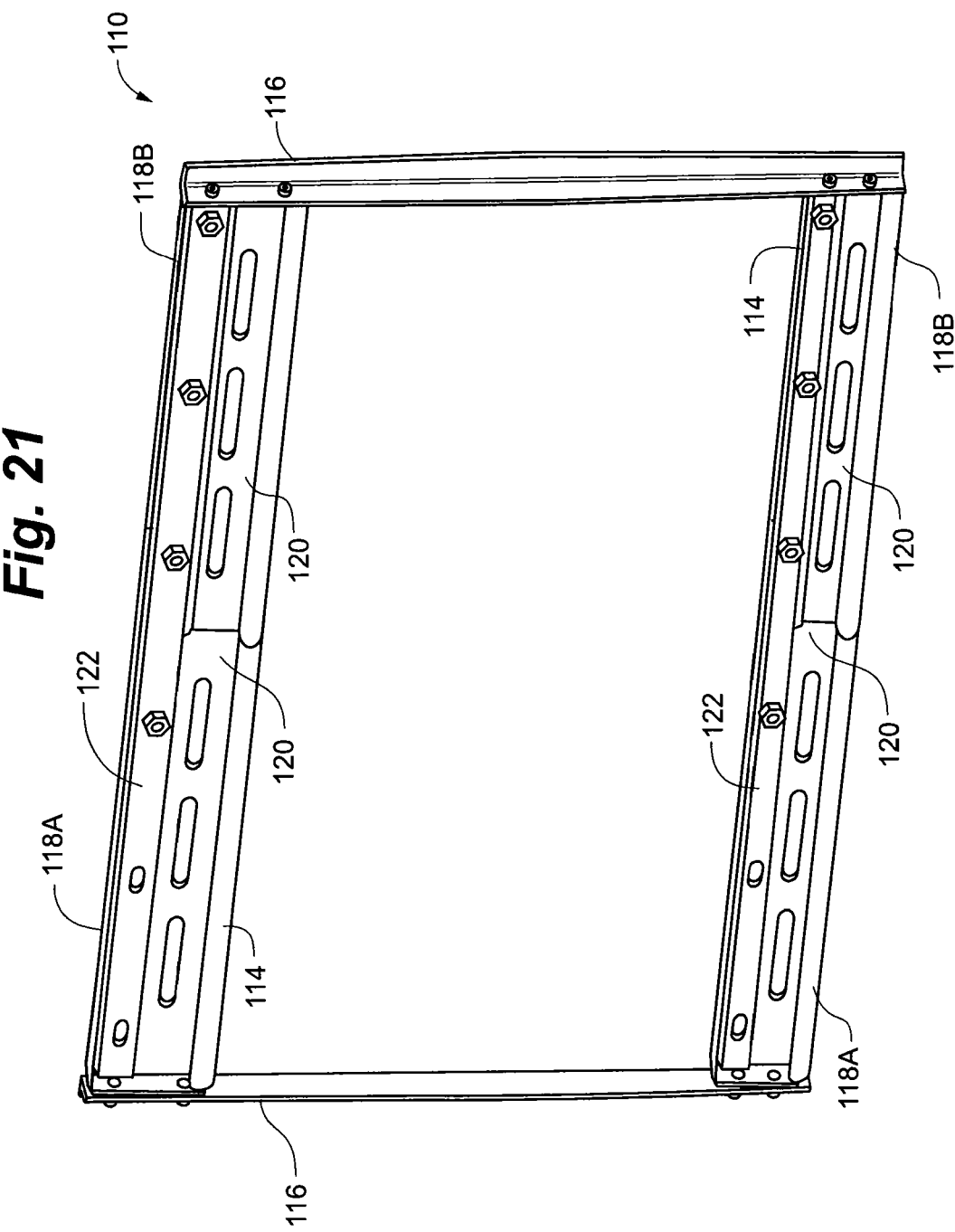
FIG. 21 is a front perspective view of a wall interface of a display mount according to an embodiment of the present invention in a narrow position.
Figure 22:
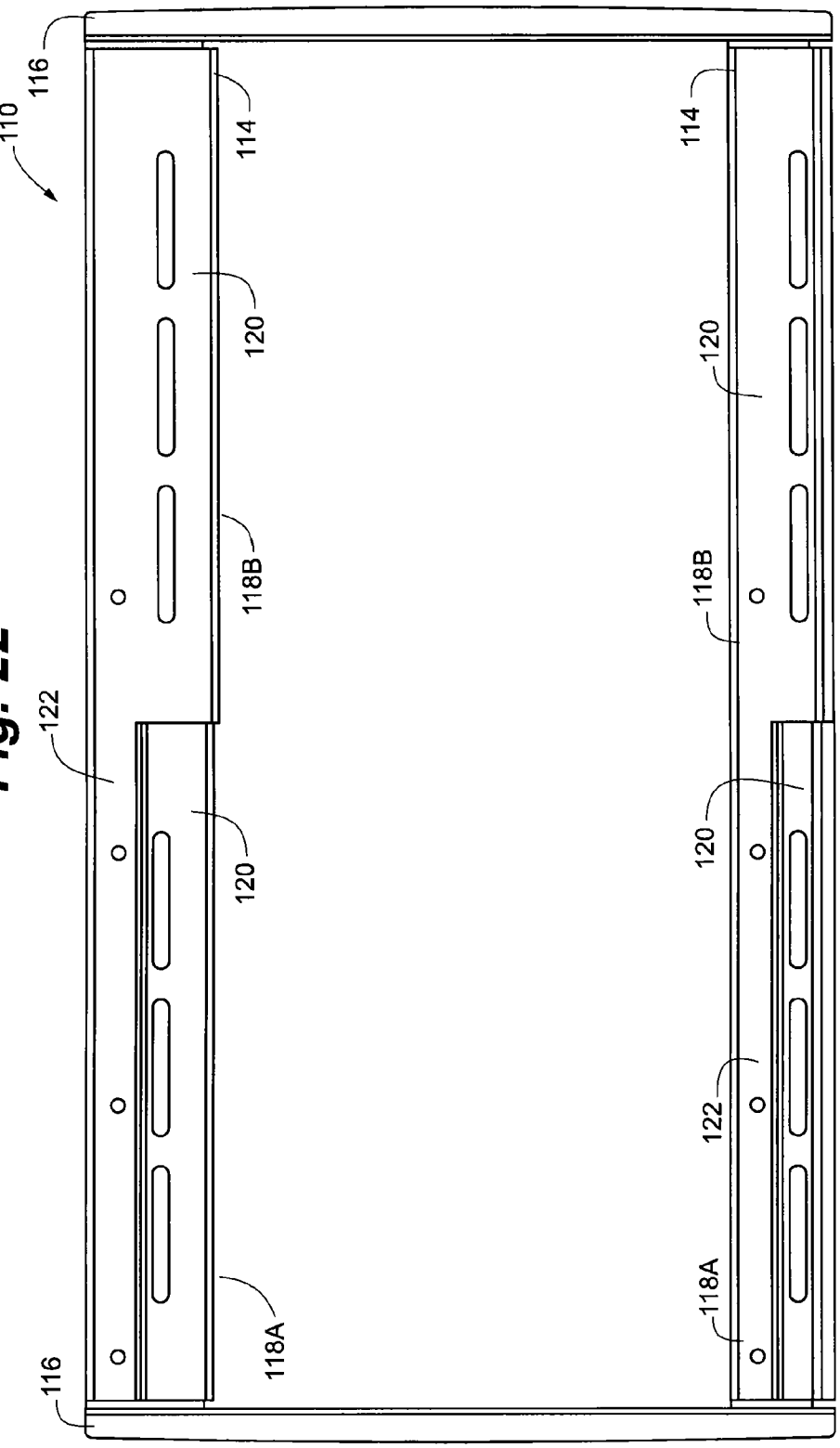
FIG. 22 is a front plan view of a wall interface of a wall interface of a display mount according to an embodiment of the present invention in a narrow position.
Figure 23:
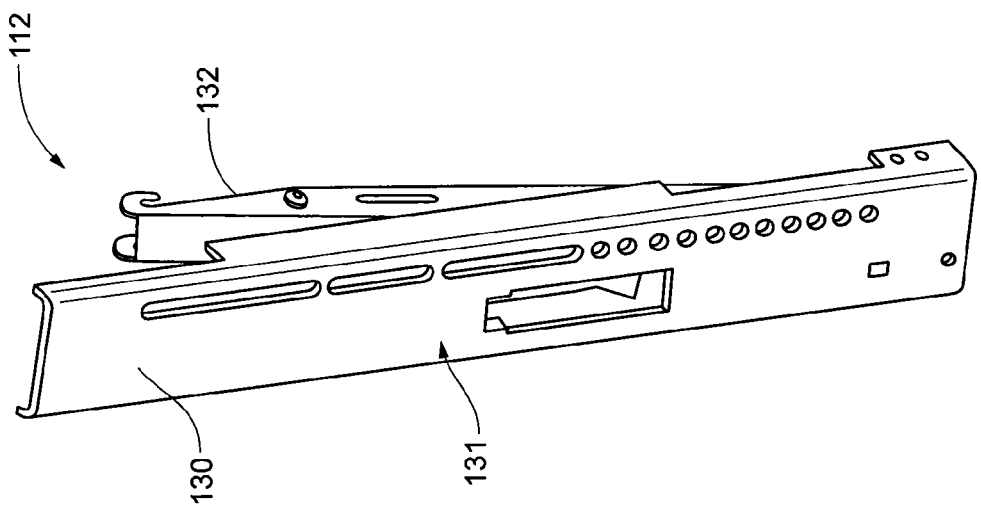
FIG. 23 is a front perspective view of display interfaces of a display mount according to an embodiment of the present invention in a tilted position.
Figure 24:
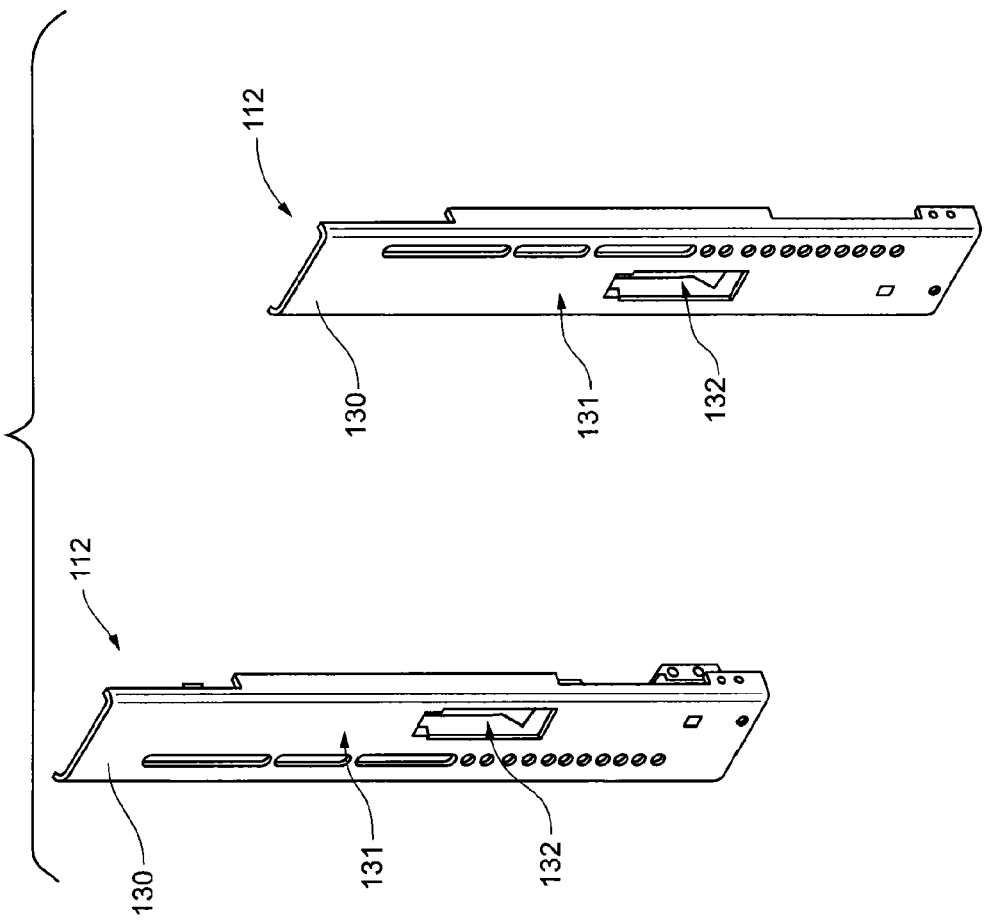
FIG. 24 is a front perspective view of display interfaces of a display mount according to an embodiment of the present invention in an upright position.
Figure 25:
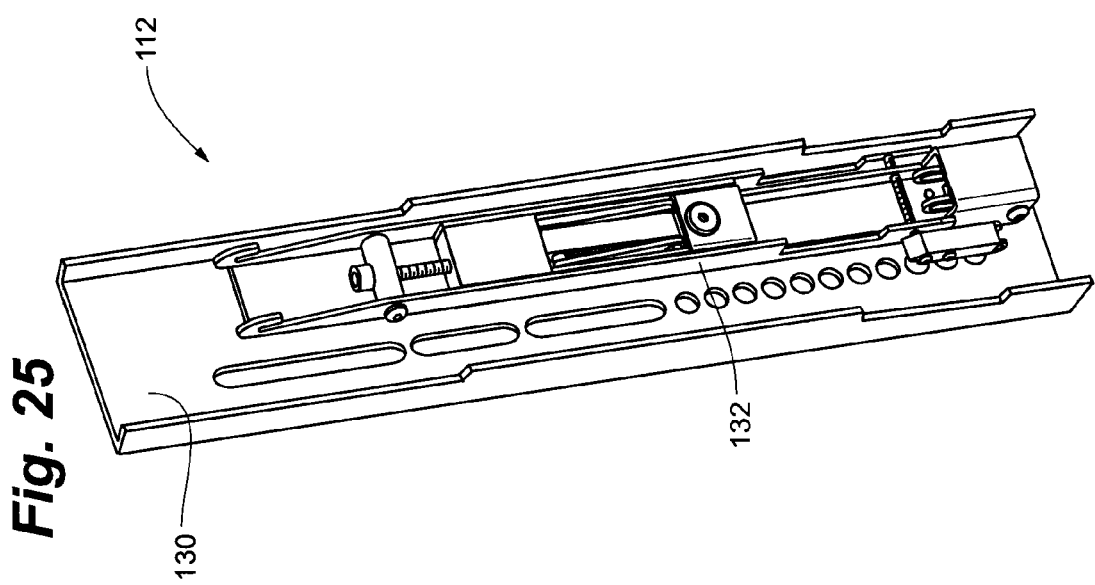
FIG. 25 is a rear perspective view of a display interface of a display mount according to an embodiment of the present invention in an upright position.
Figure 29:
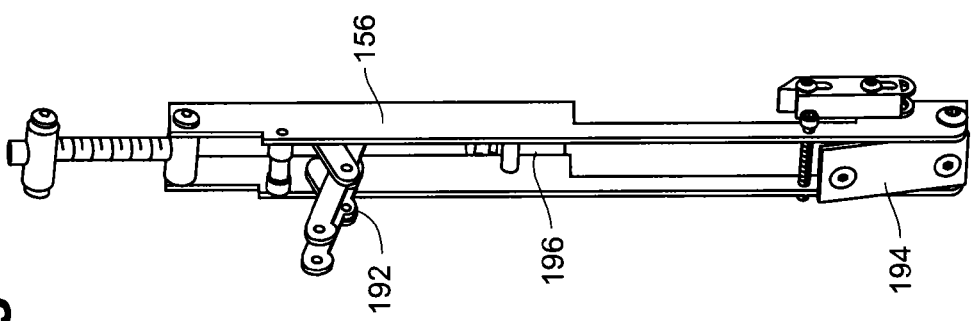
FIG. 29 is a front perspective view of an operator assembly without a hanger plate according to an embodiment of the present invention.
Figure 30:
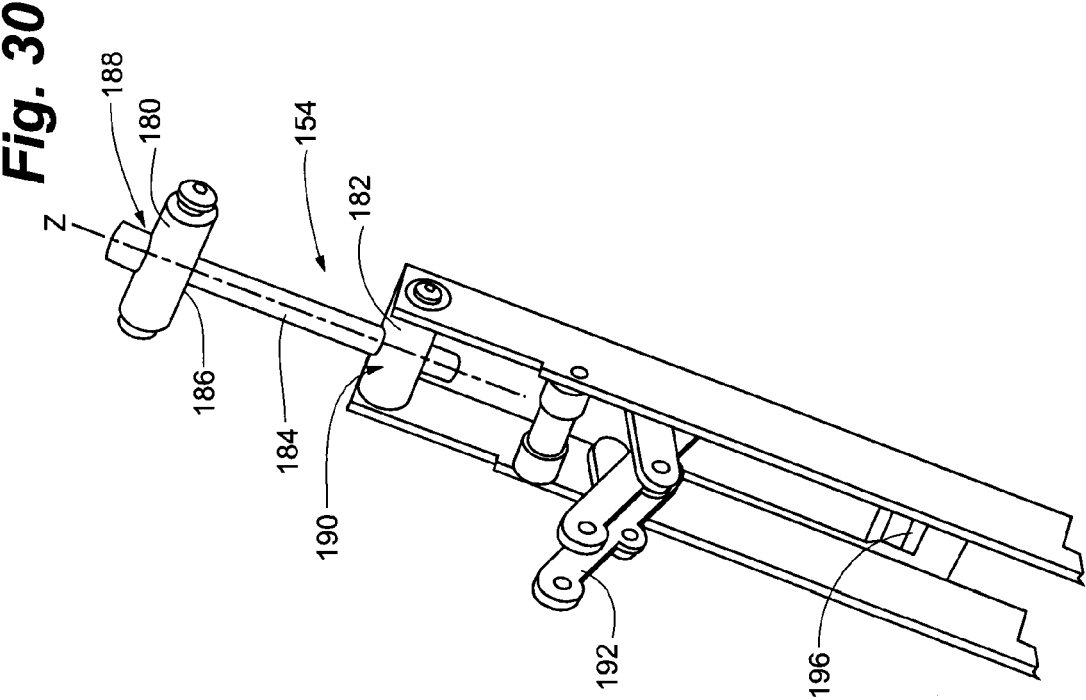
FIG. 30 is an enlarged partial front perspective view of the operator assembly of FIG. 39.

Referring to FIGS. 1A-1C and 2-4, adjustable display mount 100 generally includes wall interface 110 and display interfaces 112. Wall interface 110 has adjustable width wall plates 114 and connecting brackets 116, as depicted in FIGS. 18-19 and 21-22. Each wall plate 114 generally includes opposing spacing brackets 118A, B. Although spacing brackets 118A, B may be configured in any number of ways, spacing brackets 118A, B generally include body 120 and extended portion 122. Spacing bracket 118A is a mirror image of spacing bracket 118B. Spacing brackets 118A, B define apertures 124 and slots 126. Apertures 124 and slots 126 may be adapted to receive fastening members 128. In an embodiment, apertures 124 may be aligned so that wall plate 114 defines gap 129, as depicted in FIG. 28-30. In another embodiment, apertures 124 may be aligned such that gap 128 is substantially eliminated, as depicted in FIGS. 21-22.

Although the figures depict embodiments of display mount 100 having two display interfaces 112, one skilled in the art will readily recognized that display mount 100 may have fewer or more than two display interfaces 112 without departing from the spirit or scope of the present invention. Display interfaces 112 are may be substantially similar in shape and function, but may vary slightly in accordance with positioning in relation to wall interface 110.

Each display interface 112 generally includes mounting member 130 presenting display mounting surface 131 and positioning assembly 132, as depicted in FIGS. 23-26. Mounting member 130 generally includes support 134, outer flanges 136, and inner flanges 138, as depicted in FIG. 49. Support 134 defines apertures 140, slots 142, and tilt adjust opening 144. Outer flanges 136 define gap 146 adapted to receive adjustable width wall plate. 114.

Referring to FIGS. 27A-B and 28A-B, positioning assembly 132 includes hanger plate 150, retention plate 152, height adjustment mechanism 154, tilt mechanism 156, and wall plate latch 158. Hanger plate 150 has front 160 and sides 162. Each side 162 presents hook 164 and defines apertures 166, slot 168, and opening 170. Hook 164 is shaped so as to engage the upper lip of spacing bracket 118.

Figure 26:
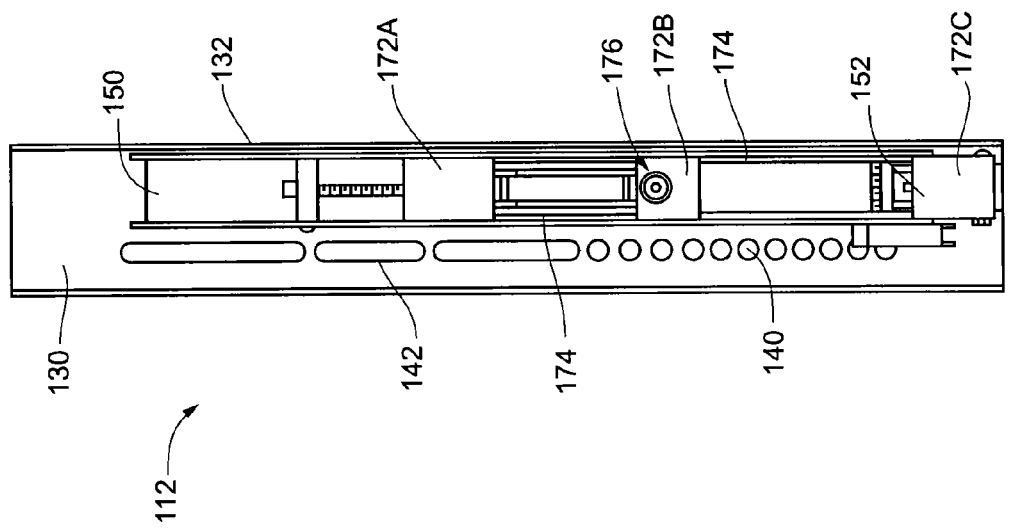
FIG. 26 is a rear plan view of a display interface of a display mount according to an embodiment of the present invention in an upright position.

Referring to FIG. 26, retention plate 152 includes rear 172A-C and sides 174. Rear 172B defines aperture 176. Sides 174 define apertures 178A-C.

Referring to FIG. 30, height adjustment mechanism 154 includes upper lift 180, lower lift 182, and screw 184. Height adjustment mechanism 154 may also include retainer 186. Upper lift 180 and lower lift 182 define aperture 188 and aperture 190, respectively. Apertures 188, 190 are generally adapted to receive screw 184.

Referring to FIGS. 29-38, tilt mechanism 156 generally includes upper slide 192, lower slide 194, and variable pitch adjuster 196. Upper slide 192 generally includes guide arm 198, primary upper tilt arm 200, and secondary upper tilt arm 202. Guide arm 198 has first section 204 and second section 206, defining slot 208. First section 204 is positioned at an angle to second section 206 according to an embodiment of the present invention. Lower slide 194 includes mounting plate interface 210, pivot axle 212, brackets 214, fasteners 215, and guides 216. Mounting plate interface 210 has front plate 218 and sideways plate 220. Front plate 218 defines apertures 222 and generally presents a mounting surface for flat-panel display 102 according to an embodiment of the present invention. Variable width adjuster 196 includes pivot base 228 defining aperture 230 receiving adjustment screw 232.

Figure 38:
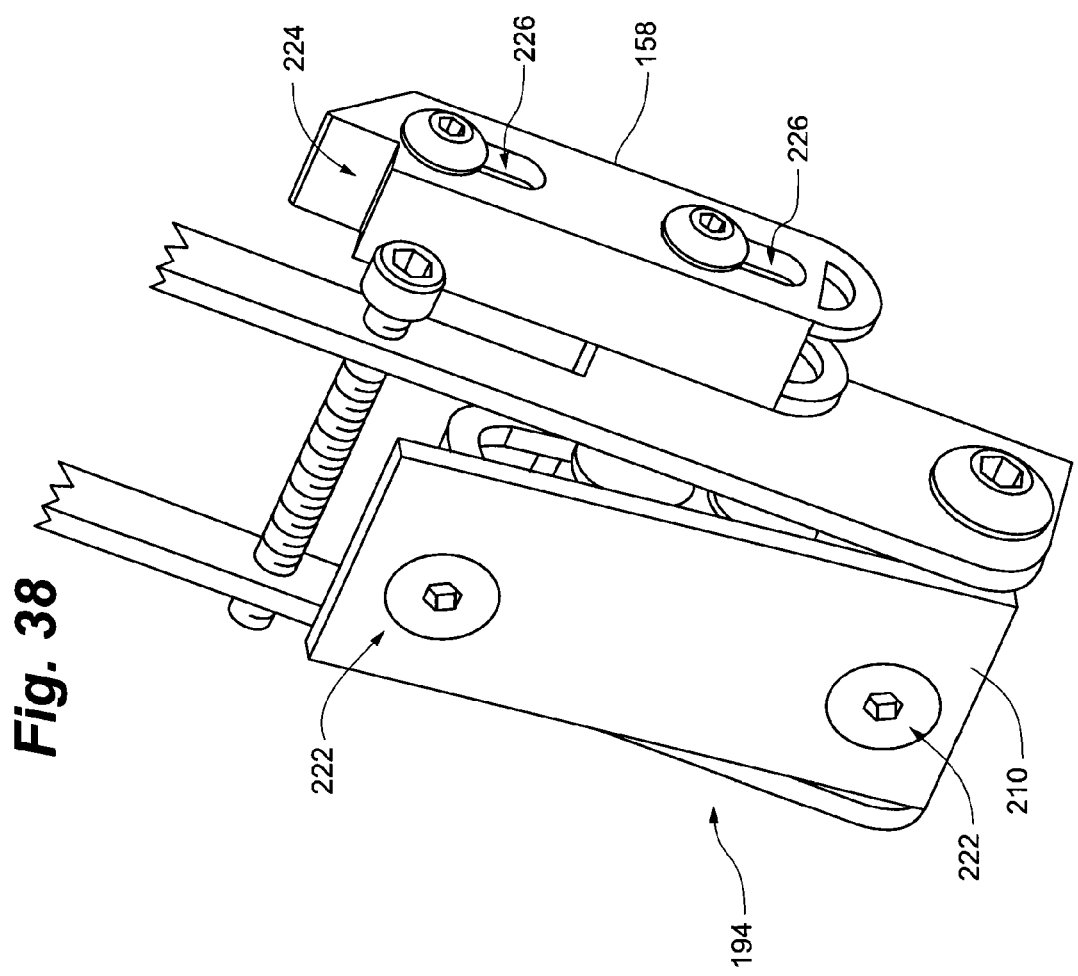
FIG. 38 is a front perspective view of a lower slide of a tilt mechanism according to an embodiment of the present invention in a tilted position.
Figure 39:
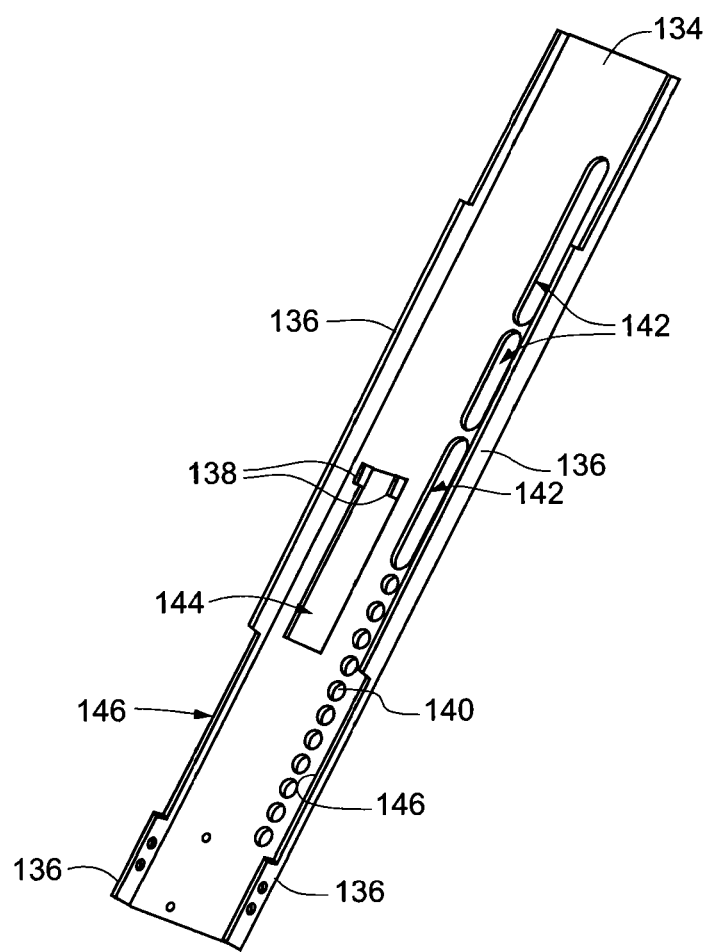
FIG. 39 is a rear perspective view of a mounting plate of a display interface according to an embodiment of the present invention.

Referring to FIG. 38, wall plate latch 158 has recessed region 224 and defines slots 226. Recessed region 224 is adapted to a lower portion of spacing bracket 118 according to an embodiment of the present invention.

In operation, display mount 100 can be used to mount articles to a flat generally vertical surface. According to an embodiment of the present invention, display mount 100 can be used to mount flat panel display 102 to wall 104. The components heretofore describes enable display mount 100 to be self-balancing within a finite range in at least three different directions to achieve a desired viewing angle of screen 106.

Referring to FIG. 1B, display mount 100 is infinitely adjustable along pathway AB, as defined by angle $\theta$, so as, for example, to adjust the angle of display mount 102 relative to wall 104. According to an embodiment, angle $\theta$ may be in the range of between approximately 45 degrees and approximately 0 degrees. In an embodiment, angle $\theta$ is approximately 10 degrees. Referring to FIG. 1C, display mount is also infinitely adjustable along length XY so as, for example, to adjust the height of display mount 102 relative to wall 104. Length XY may be in the range of approximately 12 inches to approximately 0 inches, and is typically in the range of from about 0 inches to about 2 inches. Display mount 100 is further infinitely adjustable so as, for example, to adjust the adjust the translation of a center of gravity of flat panel display 102 in a substantially horizontal plane relative to wall 104 to accommodate tilting movement of flat panel displays 104 of different thicknesses.

A feature and advantage of the triple-point adjustment of the present invention is that screen 106 may be oriented at an optimal viewing position through height and tilting adjustments. In particular, the center of gravity of flat panel display 102 can advance along a substantially horizontal plane as display mount is adjusted such that flat panel display is substantially self-balancing along pathway AB, as depicted in FIG. 1B.

Display mount 100 can be installed an adjusted in any number of ways without departing from the spirit or scope of the present invention. Although the following steps describe installation and use of display mount 100 according to an embodiment, one skilled in the art will readily recognize that the order of the steps can be varied readily without substantially adversely affecting operation.

Figure 20:
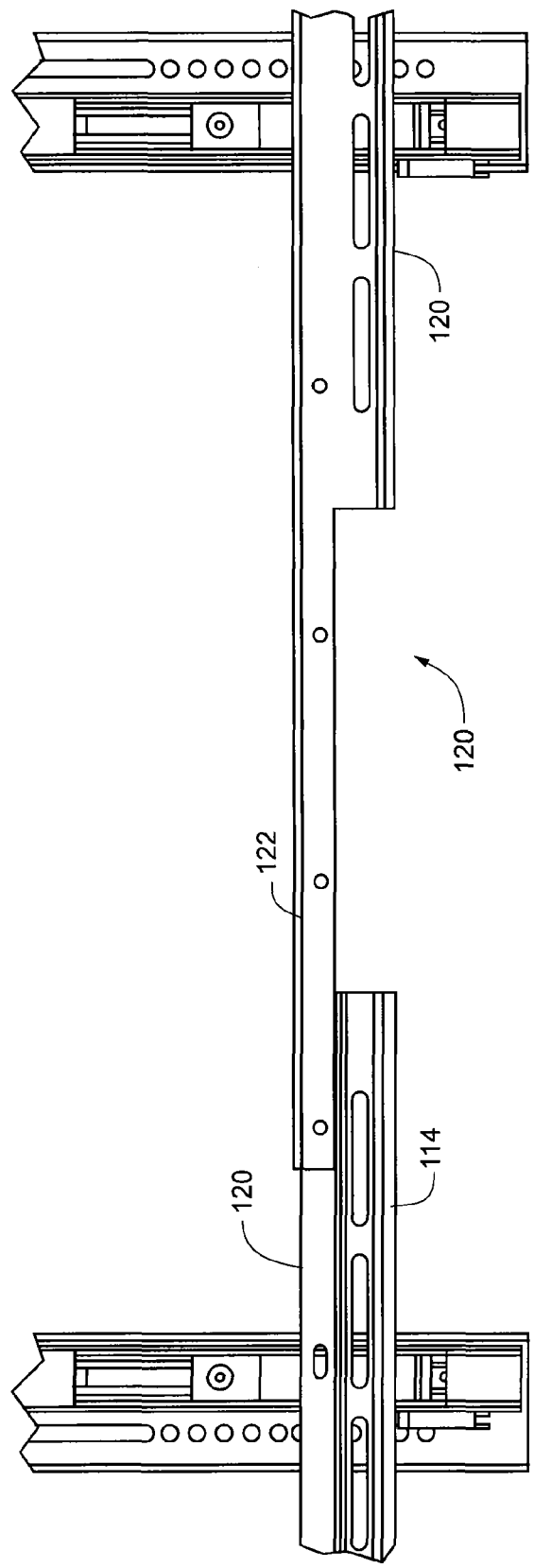
FIG. 20 is a partial front plan view of adjustable width wall plates of a wall interface of a display mount according to an embodiment of the present invention.

In an embodiment, wall interface 110 is mounted to wall 104. In particular, the width of wall interface 110 is adjusted to accommodate the width of flat panel display 102. Referring to FIGS. 18-22, the appropriate width of wall interface 110 can be achieved by altering the spacing of wall plates 114. Spacing brackets 118A, B can be brought closer together into a narrow position, as depicted in FIGS. 21-22. Each body 120 of spacing brackets 118A, B can also be spaced apart into a wide position, as depicted in FIG. 20. Spacing brackets 118A, B can be similarly positioned intermediate the wide and narrow positions. With spacing brackets 118A, B appropriately positioned, apertures 124 of respective spacing brackets 118A, B can be aligned so as to receive fastening members 128 and secure spacing brackets 118A, B at a desired width. Wall plate 114 can then be mounted to wall 104, preferably such that spacing brackets 118A, B are substantially horizontally level.

Flat panel display 102 is mounted onto display mount 100 with display interfaces 112. In an example embodiment, flat panel display 102 is mounted onto two display interfaces 112. In particular, mounting apertures (not shown) located on the rear of flat panel display 102 are aligned with apertures 140 and/or slots 142 of support 134. At least two mounting apertures of flat panel display 102 are typically aligned with apertures 222 of front plate 218 of mounting plate interface 210. Fastening members can then be used to secure flat panel display 102 to mounting members 130 of display interfaces 112.

With flat panel display 102 secured to mounting members 130, display interfaces 112 can be positioned onto wall interface 110. In particular, hooks 164 of hanger plates 150 can be situated over the top lip of upper spacing brackets 118A, B. The lower end of display interface 112 can be swung down such the tapered ends of wall plate latches 158 engage the bottom lip of lower spacing brackets 118A, B. In an example embodiment, a biasing member (not shown) urges wall plate latch 158 generally upward. As tapered end of wall plate latch contacts spacing bracket 118, wall plate latch 158 is urged downward until the tip of wall plate latch 158 is clear of lower spacing bracket 118. Once clear of lower spacing brackets 118, wall plate latch 158 is urged upward by biasing members such that recessed regions 224 engage the rear surface of spacing bracket 118. Display interface 112 is thereby substantially secured to wall interface 110.

The positioning of flat panel display on wall can be vertically adjusted with height adjustment mechanism 154. According to an embodiment, upper lift 180 is attached to hanger plate 150 and lower lift 182 is attached to retention plate 150. As screw 184 is rotated, lower lift 182 is caused to move along the axis Z of screw 184, as depicted in FIG. 30. The weight of flat panel display 102 bearing upon mounting member 130, which is attached directly to upper lift 180, causes lower lift 182 rather than upper lift 180 to be vertically adjusted. Further, since mounting member 130 is attached to retention plate 150, directional movement of lower lift 182 results in corresponding movement of mounted flat panel display 102. In this manner, flat panel display 102 can be infinitely raised and lowered within the range of adjustment permitted by vertical adjustment mechanism 154. It will be further appreciated that, where two or more display interfaces 112 are used, each of display interfaces 112 is independently height adjustable. This feature enables the display to be leveled so as to be parallel with the floor of a room, or where the floor is not level, to align the display with other features of the room such as trim or with furniture in the room.

To position flat panel display 102 at a desired viewing angle, tilt mechanism 156 can be actuated. Variable pitch adjuster 196 of tilt mechanism 156 is adjusted to accommodate for the thickness of flat panel display 102. Since flat panel displays 102 can be manufactured in varying thicknesses, the factory settings of display mount 100 may not be optimized for the particular flat panel display 102 purchased by a user. In particular, the center of gravity of mounted flat panel display 102 may not be optimally positioned for tilt adjustment. In addition, the distance from the back of flat panel display 102 to wall may not be such that the back of flat panel display 102 avoids wall 104 during tilting. According to an embodiment of the present invention, adjusting variable pitch adjuster 196 can reposition the position of the tilt axis about which the flat panel display tilts in order that center of gravity of flat panel display 102 translates in a substantially horizontal path as the display tilts, thereby rendering the display self-balancing at virtually any point. Further, the adjustment can substantially ensure that the rear of flat panel display 102 avoids contact with wall 104. An advantage of embodiments of the present invention is that the tilt mechanism 156 enables a relatively thin display mount 100 to fully adjust the tilt of a flat panel display 102. Embodiment of the display mount 100 can be less than 1¼ inches in thickness and preferably less than 1 inch thick.

Figure 40:
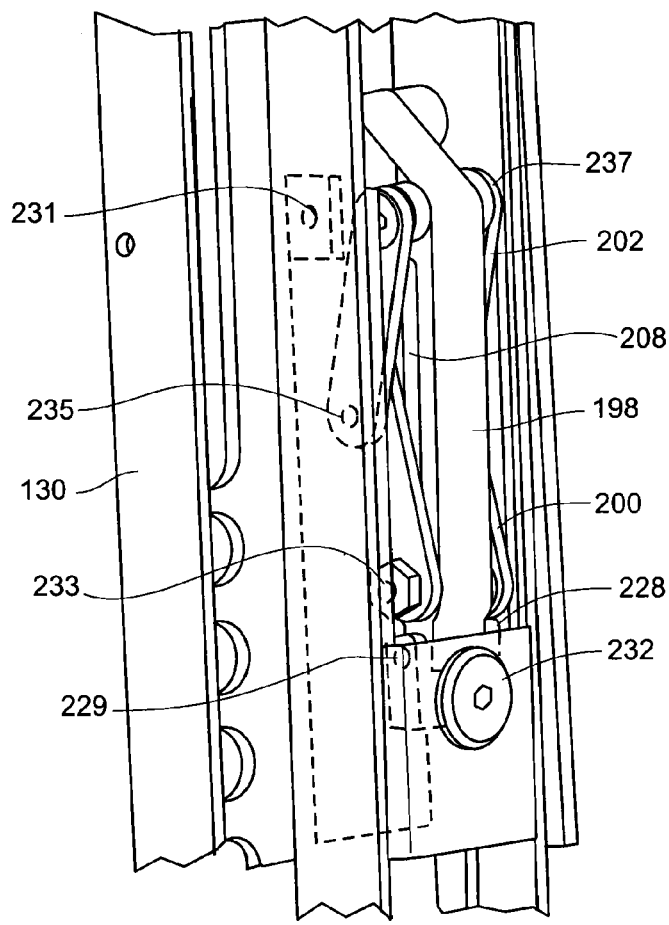
FIG. 40 is a fragmentary cutaway view of the upper slide and variable pitch adjuster mechanism of an embodiment of the invention with the mount positioned in an upright position.
Figure 41:
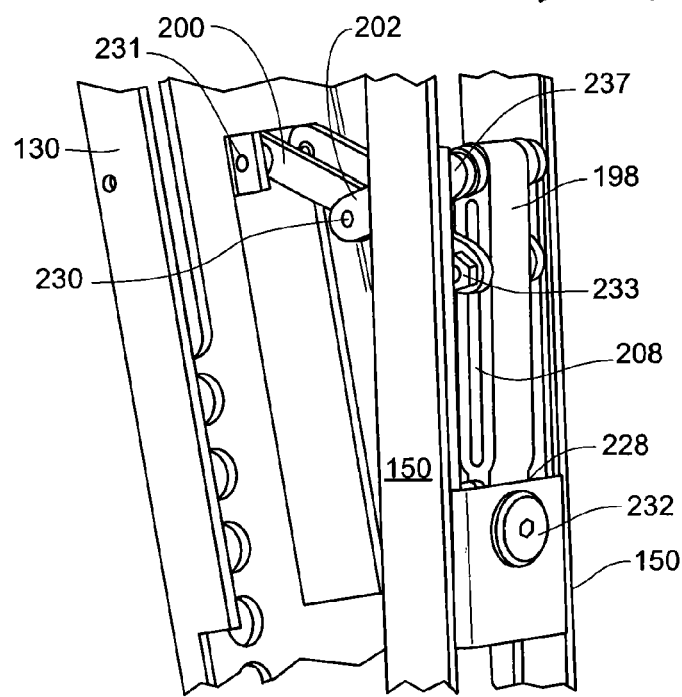
FIG. 41 is a fragmentary view of the upper slide and variable pitch adjuster as depicted in FIG. 50, with the mount in a tilt position.
Figure 42:
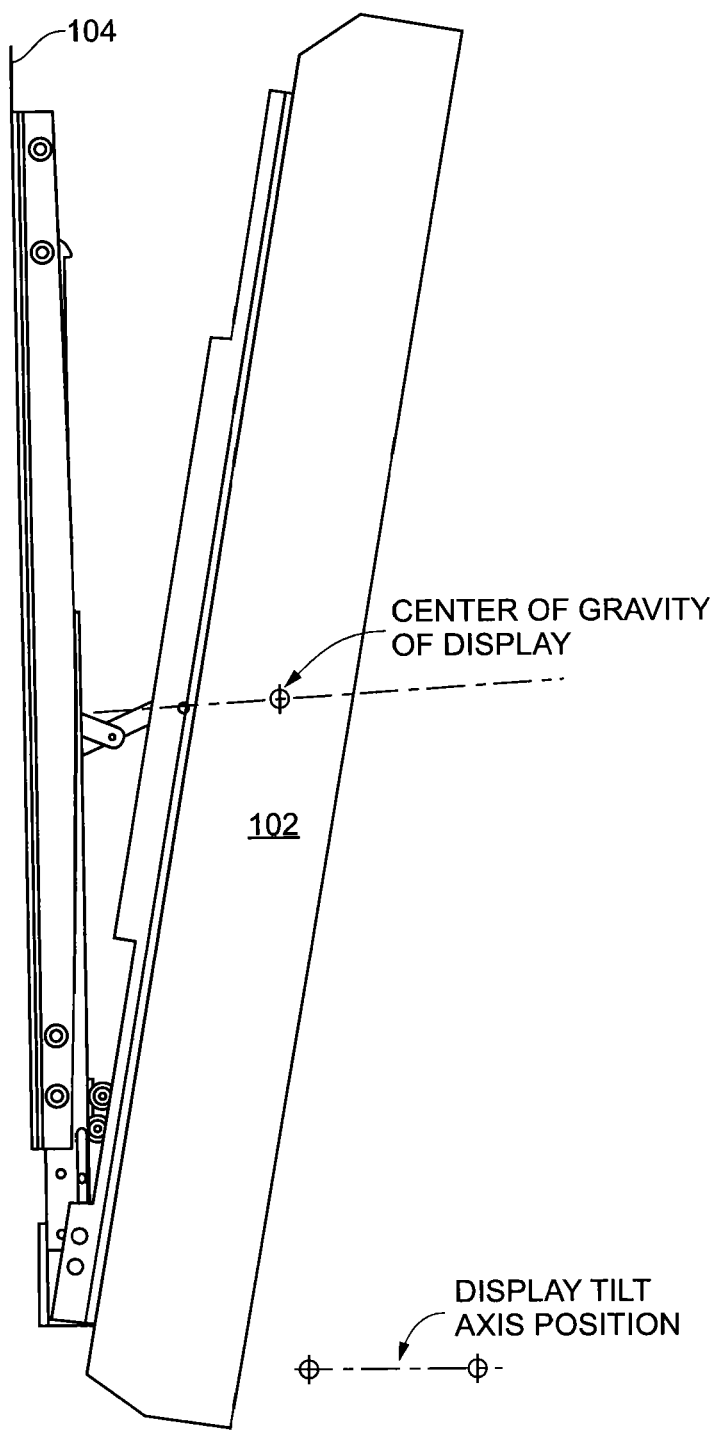
FIG. 42 is a side elevation of a mount and display according to an embodiment of the invention depicting adjustment of the display tilt axis with the variable pitch adjuster mechanism.

Referring to FIGS. 25-26, 31-33, and 40-41, pivot base 228 is pivotally attached to guide arm 198 of upper slide 192 at axle 229. One end of primary upper tilt arm 200 is pivotally coupled to mounting member 130 at pivot 231, while the opposite end of primary tilt arm 200 carries axle 233 which is slidable in slot 208. One end of secondary upper tilt arm 202 is pivotally coupled at an intermediate point along primary upper tilt arm 200 with pivot axle 235. The opposite end of secondary upper tilt arm 202 is pivotally coupled to guide arm 198 at pivot 237. As depicted in FIGS. 40 and 41, during tilting of the mount, axle 233 slides in slot 208. Those of skill in the art will appreciate that the orientation of slot 208 relative to hanger plate 150 affects the position of the tilt axis of the mount. The relative orientation of slot 208 is selectively adjustable with adjustment screw 232. Adjustment screw 232 is held in place in relation to rear 172B of retention plate 152 by a retention bracket (not shown). Depending upon the direction of rotation of adjustment screw 232, pivot base 228 is caused to translate toward or away from rear 172B of retention plate 152. Translation of pivot base 228, which is pivotally connected to guide arm 198, shifts the position of the bottom of guide arm 198 thereby causing slot 208 to be angled to a greater or lesser degree relative to hanger plate 150. As depicted in FIG. 42, as the orientation of slot 208 is shifted with adjustment screw 232, the position of the display tilt axis is shifted. Optimally, adjustment screw 232 can be adjusted to shift the tilt axis position for the particular display 102 such that the center of gravity of the display translates along a substantially horizontal path as depicted in FIG. 42. If so adjusted, display 102 will maintain its tilt position at any point without the application of outside force such as a friction control in the mount.

In an embodiment, adjustment screw 232 of variable pitch adjuster 196 is equipped with markings or indicia corresponding to various thicknesses of flat panel display 102. In this manner, a user can adjust variable pitch adjuster 196 for optimal positioning of flat panel display 102 prior to mounting. One skilled in the art will recognize that display mount 100 may include additional components to guide a user in achieving proper adjustment of variable pitch adjuster 196.

Figure 3:
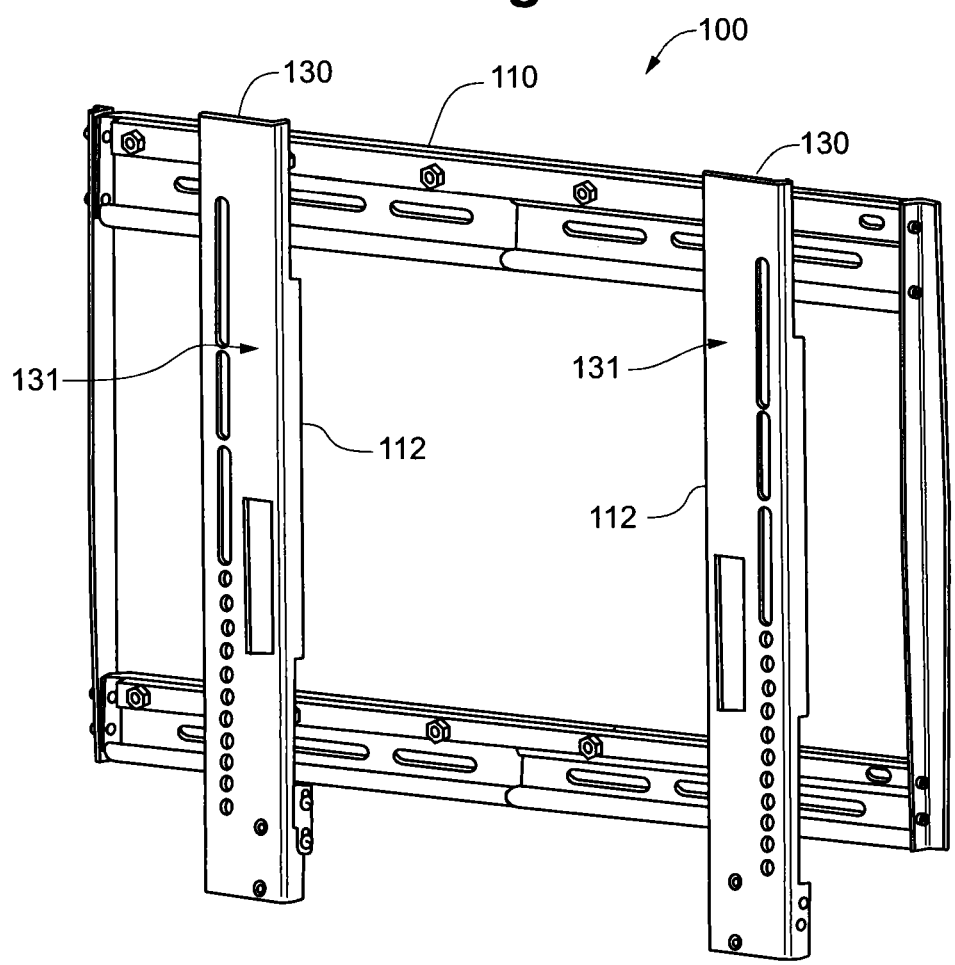
FIG. 3 is a front perspective view of a display mount according to an embodiment of the present invention in a narrow position.
Figure 4:
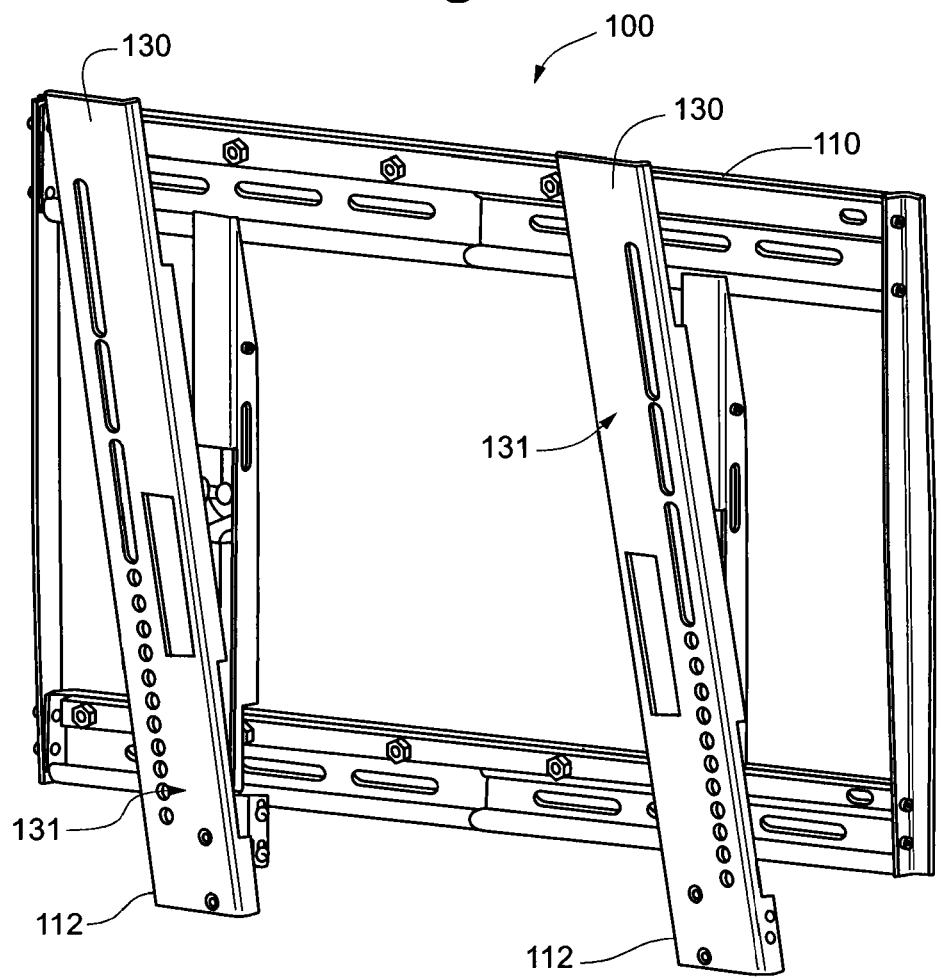
FIG. 4 is a front perspective view of a display mount according to an embodiment of the present invention in a tilted position.

Upper and lower slides 192, 194 can be actuated to tilt display mount between a tilted position, as depicted in FIGS. 2-3, and an upright position, as depicted in FIG. 4. In an embodiment, upper and lower slides 192, 194 can be actuated by exerting a force upon flat panel display 102 that is generally transverse to the mounting surface (such as wall 104) on which display mount 100 is mounted. In particular, as display mount 100 is tilted toward a fully tilted position, mounting member 130 exerts a force on upper and lower slides 192, 194, which are operably connected to mounting member 130 to which flat panel display 102 is attached.

Due to the configuration of upper slide 192 and lower slide 194, mounted flat panel display 102 does not rotate about a defined pivot point in the mount. Rather, the axis of rotation of mounted flat panel display 102 is positioned forward and generally lower relative to pivot axle 212 of lower slide 194.

In an embodiment, the structure of upper slide 192 and lower slide 194 define a tilt axis for mounted flat panel 102 that is positioned forward of display interface 112. In particular, referring to FIGS. 31-33, primary upper tilt arm 200 is rotatably connected to secondary upper tilt arm 202, which in turn is rotatably connected to guide arm 198. Referring to lower slide 194 depicted in FIGS. 34-38, mounting interface is connected to brackets 214 with fasteners 215 which are slidable within guides 216. Accordingly, mounting plate interface 210, which is connected to mounting member 130, is rotatable about pivot axle 212 as well as shiftable along guides 214.

Figure 31:
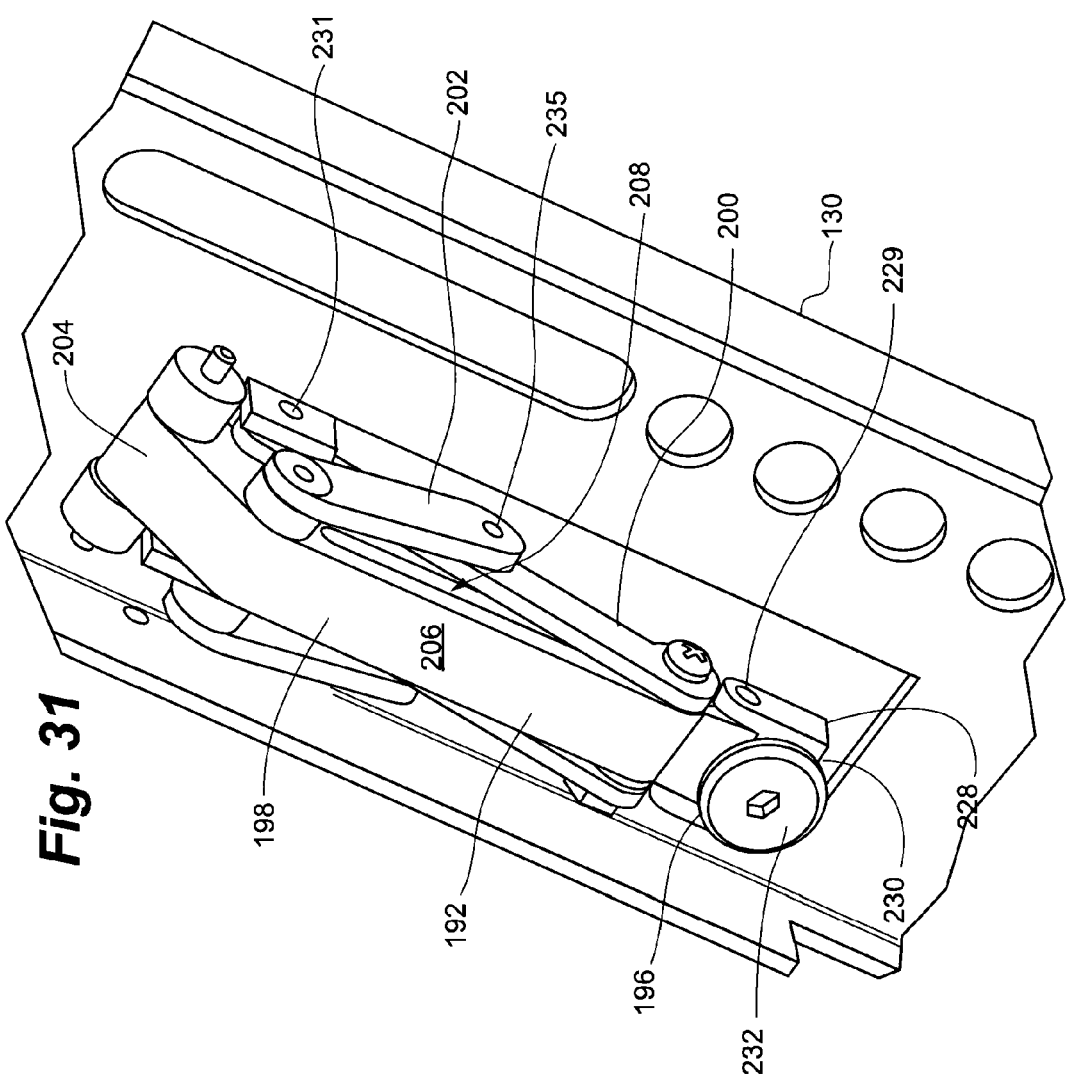
FIG. 31 is a perspective view of an upper slide of a tilt mechanism depicted in relate to a mounting plate according to an embodiment of the present invention in an upright position.
Figure 32:
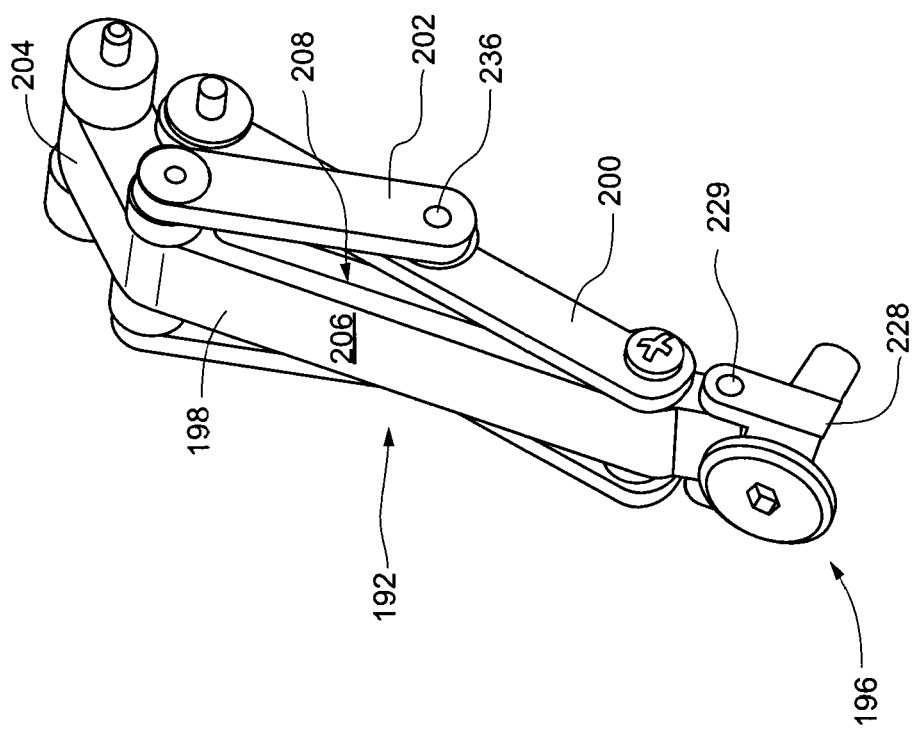
FIG. 32 is a perspective view of an upper slide of a tilt mechanism according to an embodiment of the present invention in an upright position.
Figure 33:
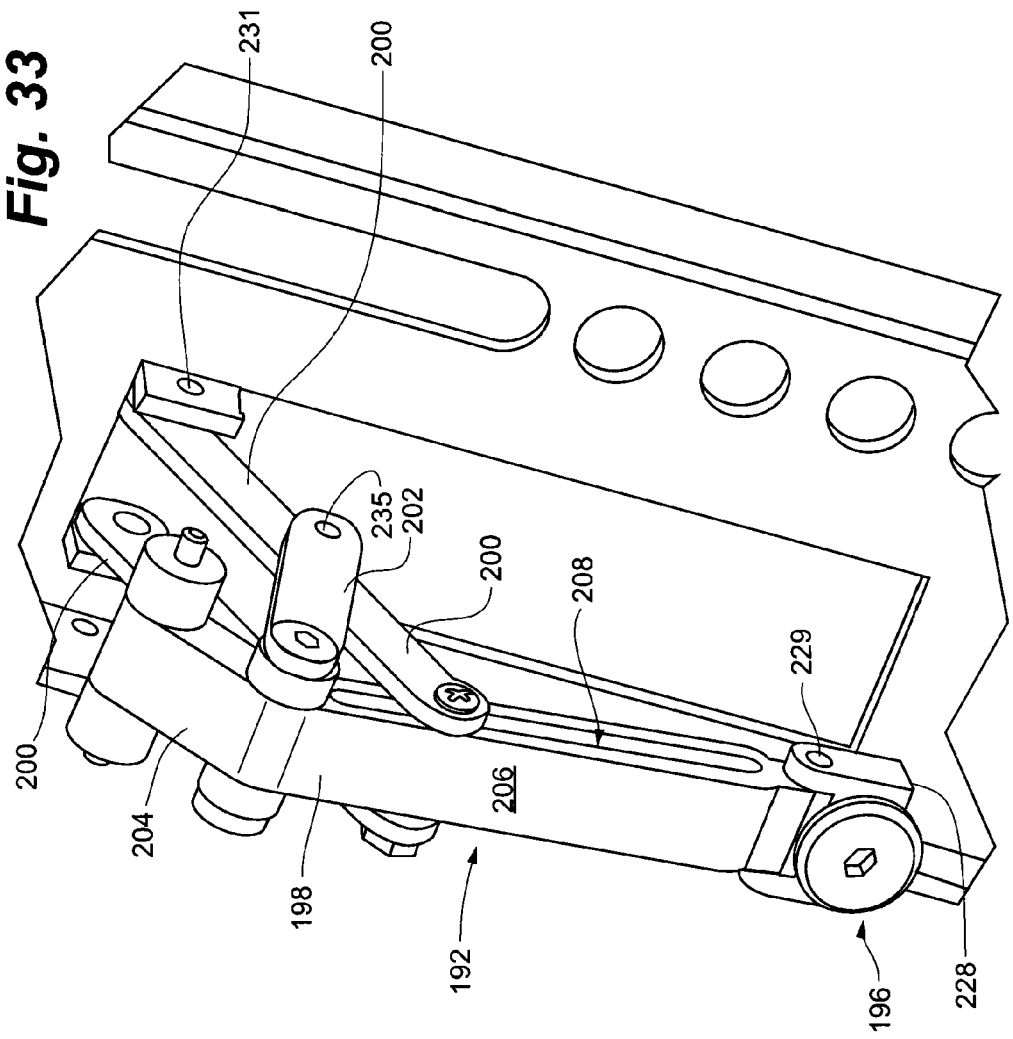
FIG. 33 is a perspective view of an upper slide of a tilt mechanism depicted in relate to a mounting plate according to an embodiment of the present invention in a tilted position.
Figure 34:
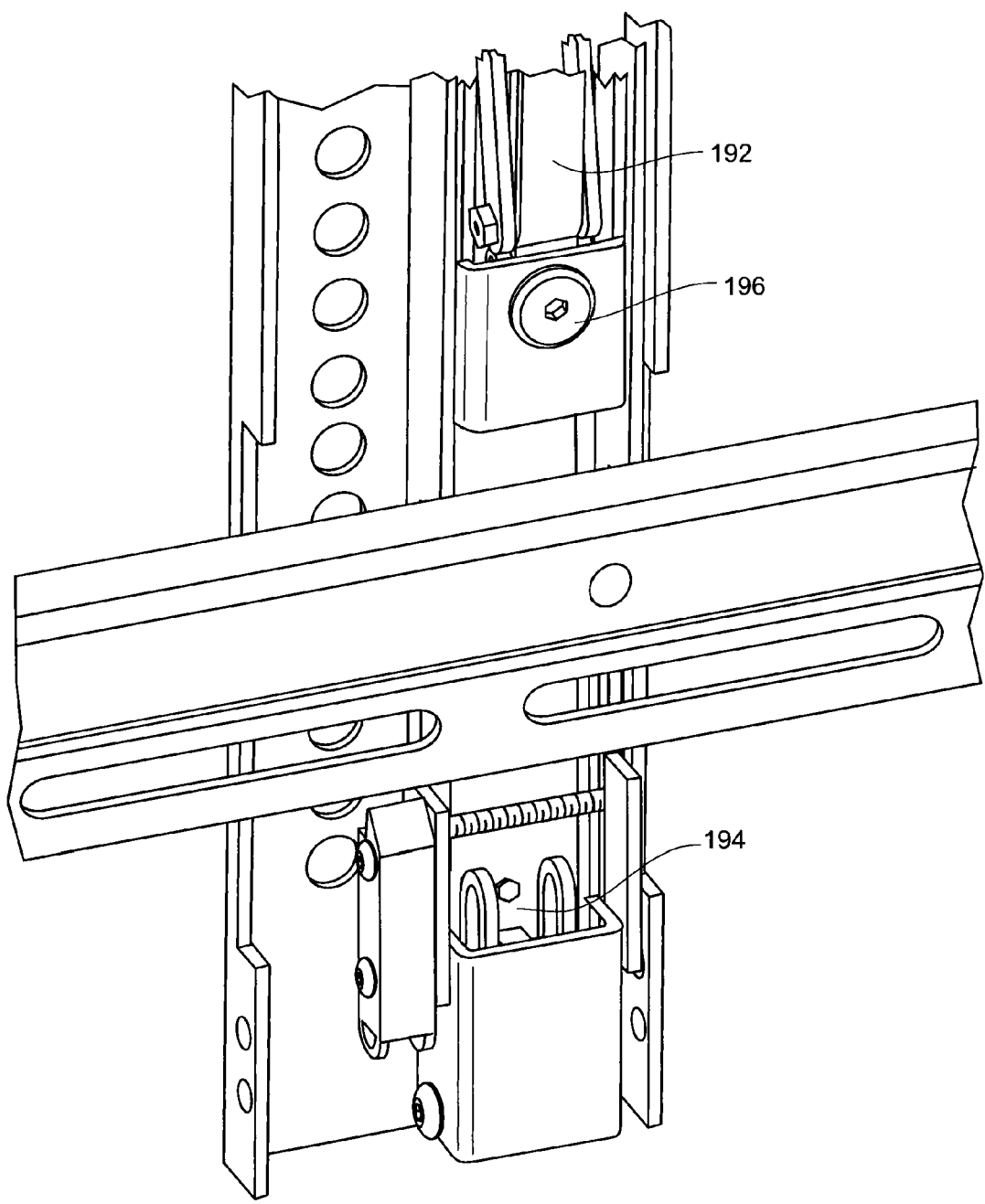
FIG. 34 is a partial rear perspective view of a display mount according to an embodiment of the present invention in an upright position and with a retention plate and wall plate latch depicted in phantom.
Figure 35:
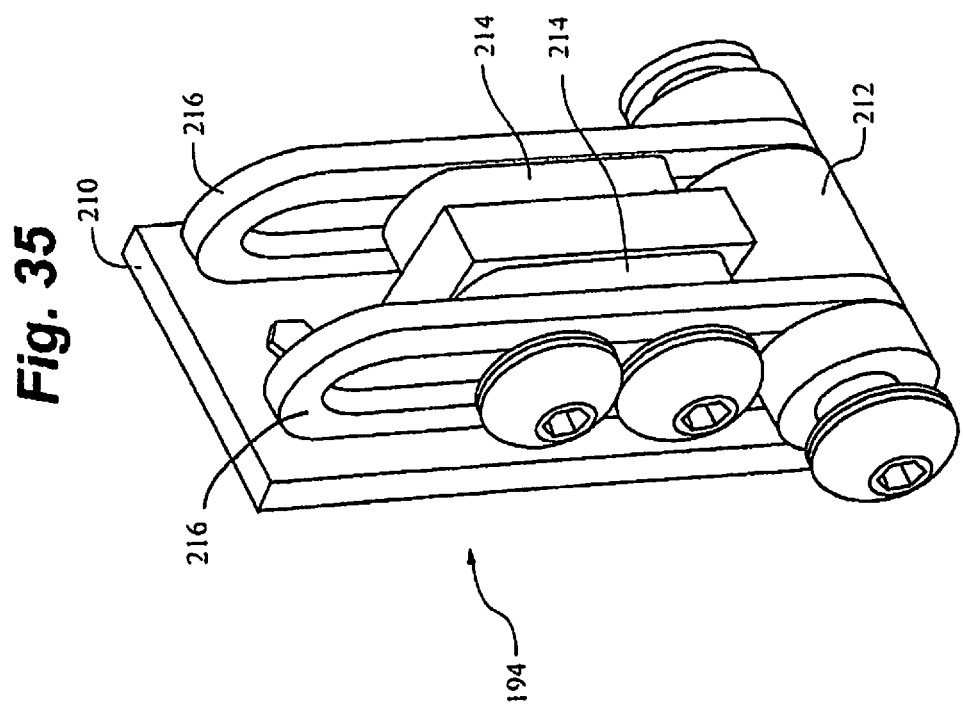
FIG. 35 is a rear perspective view of a lower slide of a tilt mechanism according to an embodiment of the present invention in an upright position.
Figure 36:
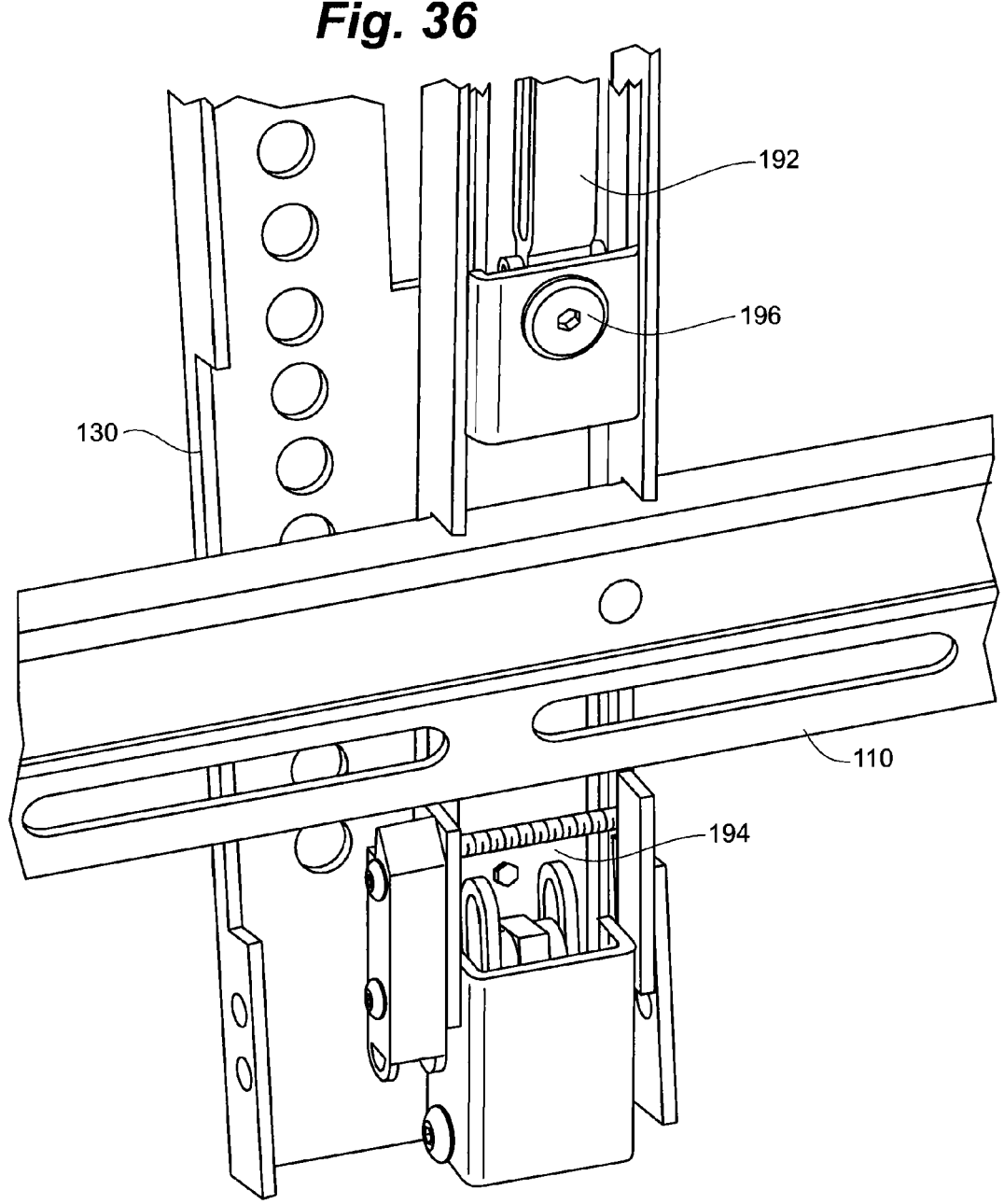
FIG. 36 is a partial rear perspective view of a display mount according to an embodiment of the present invention in a tilted position and with a retention plate and wall plate latch depicted in phantom.
Figure 37:
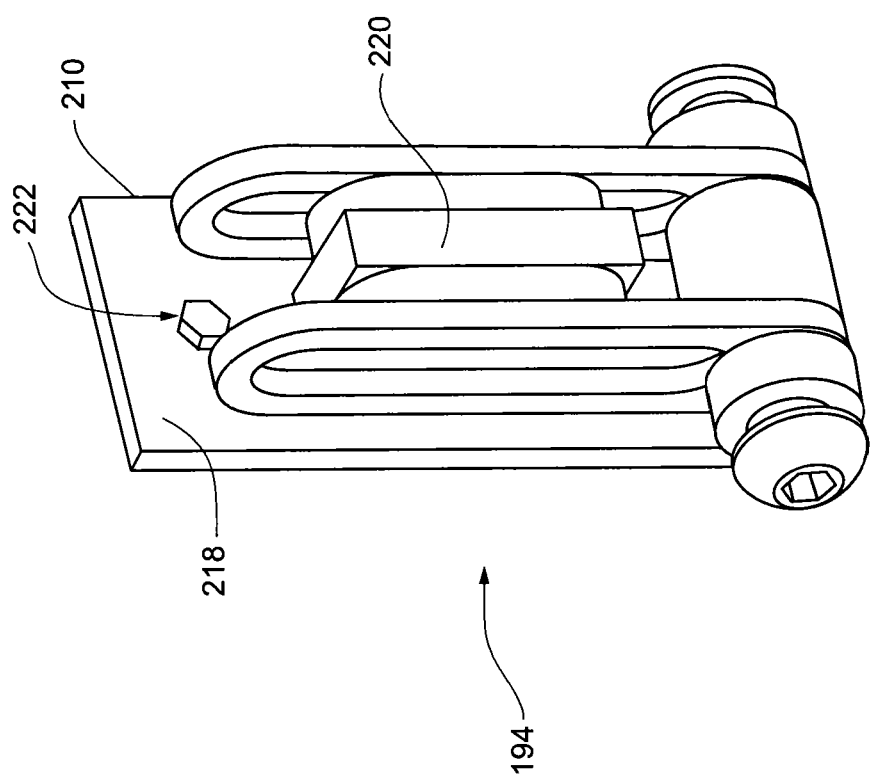
FIG. 37 is a rear perspective view of a lower slide of a tilt mechanism according to an embodiment of the present invention in a tilted position.

When tilted from a fully upright position to a fully tilted position, the bottom of mounting member 130 can therefore shift slightly upward while the top of mounting plate shifts outward. Referring to FIG. 31, the components of upper slide 202 are depicted when display mount 100 is in a fully upright position. Referring to FIG. 33, the components of upper slide are depicted when display mount is in a fully tilted position. Referring to FIGS. 34-35, the components of lower slide are depicted when display mount is in a fully upright position. Referring to FIGS. 36-38, the components of lower slide are depicted when display mount is in a partially tilted position. As can be seen from these figures, the tilting of display interface 114 is not strictly limited to rotational movement of mounting member 130 about pivot axle 212. Specifically, though mounting member 130 rotates about the pivot axle 212, guides 214 also permit shifting of mounting member 130. In this manner, during tilting of flat panel display 102, the center of gravity moves substantially horizontally rather than arcuately downward. Referring to FIG. 1B, center of gravity U (wherein display mount is in an upright position) shifts to center of gravity T (wherein display mount is in a tilted position) along a substantially horizontal plane. In addition, contact between the bottom of flat panel display 102 and wall 104 and be substantially avoided.

What is claimed is:

1. A display mount for mounting a flat panel display, the mount comprising:
    a wall interface for affixing the display mount to a mounting surface; and
    at least one display interface received on the wall interface for receiving and retaining a flat panel display, the display interface including:
        a first member engaged with the wall interface;
        a second member presenting a display receiving surface for receiving the flat panel display thereon;
        a tilt mechanism operably coupling the first member and the second member, the tilt mechanism enabling the second member to be shifted relative to the first member about a substantially horizontal tilt axis spaced apart forwardly from the display receiving surface, the tilt mechanism further including a variable pitch adjustment mechanism for selectively shifting the position of the horizontal tilt axis relative to the display interface: and
        a vertical height adjustment mechanism configured as part of the first member for vertically shifting the second member relative to the first member and wall interface to shift a mounting height of the flat panel display without affecting the spacing between the second member and first member along the horizontal tilt axis.

2. The display mount of claim 1, further comprising a flat panel display received on the display mounting surface, the flat panel display having a center of gravity, wherein the tilt mechanism is arranged to shift the center of gravity of the display in a substantially horizontal plane when the second member is shifted about the substantially horizontal tilt axis.

3. The display mount of claim 1, wherein the variable pitch adjustment mechanism is operable to enable selective adjustment of the shifting motion of the second member about the substantially horizontal tilt axis such that the center of gravity of a flat panel display received on the display mounting surface shifts in a substantially horizontal plane when the second member is shifted about the substantially horizontal tilt axis.

4. The display mount of claim 1, wherein the tilt mechanism comprises an upper tilt mechanism having a slide member defining a guide slot, a first pair of links each having a first end pivotally coupled to the second member and a second end carrying an axle slidable in the guide slot, and a second pair of links each having a first end pivotally coupled to one of the first pair of links intermediate the first end and the second end and having a second end pivotally coupled to the slide member.

5. The display mount of claim 4, wherein the variable pitch adjustment mechanism is operable to shift an orientation of the slide member.

6. The display mount of claim 1, wherein a width dimension of the wall interface is adjustable.

7. An electronic display system comprising:
    a flat panel electronic display; and
    a mount for attaching the flat panel electronic display to a substantially vertical surface, the mount comprising:
        a wall interface adapted to attach to the wall; and
        a pair of display interfaces received on the wall interface for receiving and retaining the flat panel electronic display, each display interface including:
            a positioning assembly engaged with the wall interface;
            a mounting member presenting a display receiving surface, a back surface of the flat panel electronic display received on the display receiving surface;
            a tilt mechanism operably coupling the positioning assembly and the mounting member, the tilt mechanism enabling the mounting member and flat panel electronic display to be shifted relative to the positioning assembly about a substantially horizontal tilt axis spaced apart forwardly from the display receiving surface, the tilt mechanism further including a variable pitch adjustment mechanism for selectively shifting the position of the horizontal tilt axis relative to the display interface; and
            a vertical height adjustment mechanism configured as part of the positioning assembly for vertically shifting a second member relative to a first member and wall interface to shift a mounting height of the flat panel display without affecting the spacing between the second member and first member along the horizontal tilt axis.

8. The system of claim 7, wherein the tilt mechanism is arranged to shift the center of gravity of the flat panel electronic display in a substantially horizontal plane when the mounting member is shifted about the substantially horizontal tilt axis.

9. The system of claim 7, wherein the variable pitch adjustment mechanism is operable to enable selective adjustment of the shifting motion of the mounting member about the substantially horizontal tilt axis such that the center of gravity of a flat panel display received on the display mounting surface shifts in a substantially horizontal plane when the mounting member is shifted about the substantially horizontal tilt axis.

10. The system of claim 7, wherein the tilt mechanism comprises an upper tilt mechanism having a slide member defining a guide slot, a first pair of links each having a first end pivotally coupled to the mounting member and a second end carrying an axle slidable in the guide slot, and a second pair of links each having a first end pivotally coupled to one of the first pair of links intermediate the first end and the second end and having a second end pivotally coupled to the slide member.

11. The system of claim 10, wherein the variable pitch adjustment mechanism is operable to shift an orientation of the slide member.

12. The system of claim 7, wherein a width dimension of the wall interface is adjustable.

13. A display mount for mounting a flat panel display, the mount comprising:
- a wall interface for affixing the display mount to a mounting surface; and
- at least one display interface received on the wall interface for receiving and retaining a flat panel display, the display interface including:
  - a first member engaged with the wall interface;
  - a second member presenting a display receiving surface for receiving the flat panel display thereon;
  - a tilt mechanism operably coupling the first member and the second member, the tilt mechanism enabling the second member to be shifted relative to the first member about a substantially horizontal tilt axis spaced apart forwardly from the display receiving surface, the tilt mechanism further including means for selectively shifting the position of the horizontal tilt axis relative to the display interface; and
  - a vertical height adjustment mechanism configured as part of the first member for vertically shifting the second member relative to the first member and wall interface to shift a mounting height of the flat panel display without affecting the spacing between the second member and first member along the horizontal tilt axis.

14. The display mount of claim 13, wherein the means for selectively shifting the position of the horizontal tilt axis relative to the display interface includes a variable pitch adjustment mechanism.

15. The display mount of claim 14, further comprising a flat panel display received on the display mounting surface, the flat panel display having a center of gravity, wherein the tilt mechanism is arranged to shift the center of gravity of the display in a substantially horizontal plane when the second member is shifted about the substantially horizontal tilt axis.

16. The display mount of claim 14, wherein the variable pitch adjustment mechanism is operable to enable selective adjustment of the shifting motion of the second member about the substantially horizontal tilt axis such that the center of gravity of a flat panel display received on the display mounting surface shifts in a substantially horizontal plane when the second member is shifted about the substantially horizontal tilt axis.

17. The display mount of claim 14, wherein the tilt mechanism comprises an upper tilt mechanism having a slide member defining a guide slot, a first pair of links each having a first end pivotally coupled to the second member and a second end carrying an axle slidable in the guide slot, and a second pair of links each having a first end pivotally coupled to one of the first pair of links intermediate the first end and the second end and having a second end pivotally coupled to the slide member.

18. The display mount of claim 17, wherein the variable pitch adjustment mechanism is operable to shift an orientation of the slide member.

19. The display mount of claim 14, wherein a width dimension of the wall interface is adjustable.

* * * * *